US010180262B2

(12) United States Patent
Niikura

(10) Patent No.: US 10,180,262 B2
(45) Date of Patent: Jan. 15, 2019

(54) MANAGEMENT APPARATUS FOR PLURALITY OF AIR CONDITIONING APPARATUSES

(71) Applicant: DAIKIN INDUSTRIES, LTD., Osaka-shi, Osaka (JP)

(72) Inventor: Nanae Niikura, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 15/574,731

(22) PCT Filed: May 16, 2016

(86) PCT No.: PCT/JP2016/064501
§ 371 (c)(1),
(2) Date: Nov. 16, 2017

(87) PCT Pub. No.: WO2016/186081
PCT Pub. Date: Nov. 24, 2016

(65) Prior Publication Data

US 2018/0172309 A1 Jun. 21, 2018

(30) Foreign Application Priority Data

May 19, 2015 (JP) ................................ 2015-102021

(51) Int. Cl.
*F24F 11/41* (2018.01)
*F24F 11/47* (2018.01)
(Continued)

(52) U.S. Cl.
CPC .............. *F24F 11/47* (2018.01); *F24F 11/41* (2018.01); *F24F 11/46* (2018.01); *F24F 11/61* (2018.01);
(Continued)

(58) Field of Classification Search
CPC ................................ F24F 11/47; F24F 11/41
See application file for complete search history.

(56) References Cited

U.S. PATENT DOCUMENTS 8,488,500 B2 * 7/2013 Mukherjee ........ H04W 52/0216 370/311
2017/0116686 A1 * 4/2017 Fujita .................... G06Q 50/06
(Continued)

FOREIGN PATENT DOCUMENTS

JP 2012-165513 A 8/2012

OTHER PUBLICATIONS

European Search Report of corresponding EP Application No. 16 79 6474.1 dated May 9, 2018.
(Continued)

*Primary Examiner* — Jared Fureman
*Assistant Examiner* — Joel Barnett
(74) *Attorney, Agent, or Firm* — Global IP Counselors, LLP

(57) ABSTRACT

A management apparatus manages a plurality of air conditioning apparatuses based on a power consumption amount adjustment request. The management apparatus includes a distribution information generation unit and an information acquisition unit that acquires current state information for each air conditioning apparatus. The distribution information generation unit, when the power consumption amount adjustment is requested, generates distribution information used to distribute the power consumption amount adjustment request to the air conditioning apparatuses. The distribution information generation unit calculates a probability of each air conditioning apparatus canceling the power consumption amount adjustment request at a future time relative to a time point of the current state information, based on the current state information. The distribution
(Continued)

information is updated by reducing a distribution amount to one of the air conditioning apparatuses and allocating the distribution amount to another one of the air conditioning apparatuses in one of two ways.

6 Claims, 15 Drawing Sheets

(51) Int. Cl.

| | |
|---|---|
| ***F24F 11/61*** | (2018.01) |
| ***F24F 11/65*** | (2018.01) |
| ***H02J 3/14*** | (2006.01) |
| ***G06Q 50/06*** | (2012.01) |
| ***F24F 11/89*** | (2018.01) |
| ***F24F 11/46*** | (2018.01) |
| *F24F 110/10* | (2018.01) |
| *F24F 110/12* | (2018.01) |
| *F24F 140/60* | (2018.01) |
| *F24F 130/10* | (2018.01) |

(52) U.S. Cl.
CPC ............. *F24F 11/65* (2018.01); *F24F 11/89* (2018.01); *G06Q 50/06* (2013.01); *H02J 3/14* (2013.01); *F24F 2110/10* (2018.01); *F24F 2110/12* (2018.01); *F24F 2130/10* (2018.01); *F24F 2140/60* (2018.01); *Y02B 70/3225* (2013.01); *Y02B 70/3275* (2013.01); *Y04S 20/222* (2013.01); *Y04S 20/244* (2013.01)

(56) References Cited

U.S. PATENT DOCUMENTS

2017/0146259 A1* 5/2017 Zhao ...................... G05B 15/02
2017/0198932 A1* 7/2017 Sato ......................... F24F 11/89

OTHER PUBLICATIONS

International Search Report of corresponding PCT Application No. PCT/JP2016/064501 dated Jul. 26, 2016.
International Preliminary Report of corresponding PCT Application No. PCT/JP2016/064501 dated Nov. 30, 2017.

* cited by examiner

| | POWER CONSUMPTION AMOUNT PLANNED TO BE REDUCED DURING DR FOR EACH TIME PERIOD | | | |
|---|---|---|---|---|
| | 3/20 12P.M | 3/20 13P.M | 3/20 14P.M | ... |
| CONSUMER A | 100kW | 300kW | 0kW | ... |
| CONSUMER B | 300kW | 200kW | 200kW | ... |
| CONSUMER C | 0kW | 100kW | 200kW | ... |
| CONSUMER D | 300kW | 200kW | 300kW | ... |
| CONSUMER E | 100kW | 200kW | 0kW | ... |

FIG. 5

MANAGEMENT APPARATUS FOR PLURALITY OF AIR CONDITIONING APPARATUSES

CROSS-REFERENCE TO RELATED APPLICATIONS

This U.S. National stage application claims priority under 35 U.S.C. § 119(a) to Japanese Patent Application No. 2015-102021, filed in Japan on May 19, 2015, the entire contents of which are hereby incorporated herein by reference.

TECHNICAL FIELD

The present invention relates to a management apparatus for a plurality of air conditioning apparatuses.

BACKGROUND ART

There has been proposed having an agent on a power supply side request demand control for adjusting a power consumption amount (request adjustment of a power consumption amount) in order to avoid the occurrence of a shortage in amount of power supply when electricity supply is tight as a result of a temporary increase in power consumption amount due to a number of apparatuses that consume power operating at the same time.

The operability of such a system is improved by granting a financial incentive or other incentive to a consumer who has acceded such a power consumption amount adjustment request.

In this case, the adjustment request amount of the power consumption amount requested by the agent on the power supply side is so large that it cannot be acceded by the amount of adjustment by one consumer, and hence a management apparatus configured to manage a larger number of consumers is employed.

When the management apparatus receives the power consumption amount adjustment request from the agent on the power supply side, in order for the adjustment request to be acceded, for example, the management apparatus specifies a consumer who can accept the request from among a plurality of consumers managed by the management apparatus, and makes that consumer adjust their power consumption amount. Then, the consumer who has cooperated by adjusting their power consumption amount is granted the incentive.

Here, for example, in the example described in JP-A 2012-165513, a management apparatus periodically accepts schedules of achievable power consumption reduction amounts for each consumer, and predetermines a power reduction schedule for each of the consumers. Then, when the management apparatus receives a power consumption amount adjustment request from an agent on a power supply side, the management apparatus implements the power reduction schedules that have been predetermined for each of the consumers.

SUMMARY

Technical Problem

In the example of JP-A 2012-165513 described above, it is assumed that there is a case in which the consumers are unable to carry out the reduction in accordance with the predetermined power reduction schedules after the management apparatus has actually received the power consumption amount adjustment request from the agent on the power supply side. In order to eliminate the error that is generated in this case, Patent Literature 1 proposes generating an error adjustment instruction for requesting further reduction, and sending that instruction to any of the consumers.

Here, in the example of JP-A 2012-165513, the timing at which the adjustment is carried out in accordance with the error adjustment instruction is a time after the state in which the consumers cannot carry out the reduction in accordance with the power reduction schedule has already occurred.

Therefore, a state occurs in which the reduction is unable to be contained within a range of a power consumption amount that is reduced based on the power reduction schedule while the consumer is acceding to the adjustment request after accepting the power consumption amount adjustment request from the agent on the power supply side. Due to this, it becomes difficult to stably accede to the power consumption amount adjustment request from the agent on the power supply side.

Further, it is particularly difficult to stably accede to the power consumption amount adjustment request from the agent on the power supply side with an air conditioning apparatus in which the amount of power consumption greatly fluctuates depending on a change in air-conditioning load.

The present invention has been made in consideration of the above-mentioned problems, and has an object to provide a management apparatus for a plurality of air conditioning apparatuses that is capable of more stably acceding to a power consumption amount adjustment request.

Solution to Problem

A management apparatus for a plurality of air conditioning apparatuses according to a first aspect of the present invention is configured to manage, based on a power consumption amount adjustment request, the air conditioning apparatuses which condition air in each of a plurality of target spaces, and includes a distribution information generation unit, and an information acquisition unit. The distribution information generation unit is configured to, when a power consumption amount adjustment is requested, generate distribution information used for distributing the power consumption amount adjustment request to the air conditioning apparatuses. The information acquisition unit is configured to acquire current state information on the air conditioning apparatuses. The distribution information generation unit is configured to calculate a probability of each of the air conditioning apparatus canceling the power consumption amount adjustment request at a future time relative to a time point of the current state information, based on the current state information acquired by the information acquisition unit. The distribution information generation unit is further configured to update the distribution information by either reducing a distribution amount to one of the air conditioning apparatuses for which the probability is higher than a predetermined value, and allocating the distribution amount to another one of the air conditioning apparatuses, or reducing the distribution amount to one of the air conditioning apparatuses for which an increase rate of the probability is higher than a predetermined value, and allocating the distribution amount to another one of the air conditioning apparatuses.

Here, the "cancellation" includes both cancellation while carrying out the reduction in accordance with the power consumption amount adjustment request, and cancellation of a reduction plan before a time period in which the power consumption amount adjustment request is to be acceded.

Note that the management apparatus for the air conditioning apparatuses itself may include a storage unit that stores the current state information, which is known by each of the air conditioning apparatuses. In this case, the information acquisition unit may be configured to acquire from the storage unit the current state information which is known by each of the air conditioning apparatuses. Further, the management apparatus for the air conditioning apparatuses may not include the storage unit that stores the current state information, which is known by each of the air conditioning apparatuses, and the current state information, which is known by each of the air conditioning apparatuses, may be stored in a storage apparatus that is separate from the management apparatus (for example, a cloud information terminal or the like that is connected to the management apparatus in a communicable manner via a network). In this case, the information acquisition unit may be configured to acquire the current state information, which is known by each of the air conditioning apparatuses, from the storage unit connected in a communicable manner to the management apparatus for a plurality of air conditioning apparatuses.

Note that the "air conditioning apparatus" may be an apparatus having a combination of one outdoor unit and one indoor unit, an apparatus having a combination of one outdoor unit and a plurality of indoor units, an apparatus having a combination of a plurality of outdoor units and one indoor unit, or an apparatus having a combination of a plurality of outdoor units and a plurality of indoor units. Among those combinations, the indoor units of the air conditioning apparatus having a plurality of indoor units may be provided in the same target space to be air conditioned.

In the management apparatus for the air conditioning apparatuses according to this aspect, the probability of the air conditioning apparatus canceling the power consumption amount adjustment request at a future time with respect to the time point of the current state information is calculated for each of the air conditioning apparatuses based on the current state information on each of the air conditioning apparatuses. Further, the distribution information generation unit updates the distribution information by either reducing the distribution amount to the air conditioning apparatus for which the probability is higher than a predetermined value, and allocating the distribution amount to another one of the air conditioning apparatuses, or reducing the distribution amount to the air conditioning apparatus for which the increase rate of the probability is higher than a predetermined value, and allocating the distribution amount to another one of the air conditioning apparatuses. Therefore, even when the agent on the power supply side issues the power consumption amount adjustment request, it is possible to finish allocation processing for distribution to accede to the adjustment request up until that time point, to thereby stably accede to the power consumption amount adjustment request.

A management apparatus for the air conditioning apparatuses according to a second aspect of the present invention is the management apparatus for the air conditioning apparatuses according to the first aspect of the present invention, in which the current state information includes current state environment information on each of the target spaces. The environment information includes at least temperature information on the target spaces. The distribution information generation unit calculates the probability based on the temperature information acquired by the information acquisition unit such that the probability increases as an uncomfortable degree in the target space increases.

Here, the "uncomfortable degree" is not particularly limited, and, for example, may be set in advance to increase as a temperature of the target space largely exceeds a predetermined upper limit temperature, or increase as the temperature of the target space largely falls below a predetermined lower limit temperature.

With the management apparatus for the air conditioning apparatuses according to this aspect, the distribution information generation unit performs calculation such that the probability of canceling the power consumption amount adjustment request increases when a degree of comfortableness of the target space satisfies a predetermined uncomfortable condition. In this way, as in the cases in which the target space is comfortable and the target space has changed to become uncomfortable, or the like, in order to make the target space comfortable, it is possible to perform calculation such that the probability increases for an air conditioning apparatus predicted to cancel the power consumption amount adjustment request and increase the power consumption amount, to thereby more accurately identify an air conditioning apparatus that is to cancel.

A management apparatus for the air conditioning apparatuses according to a third aspect of the present invention is the management apparatus for the air conditioning apparatuses according to the second aspect of the present invention, in which the air conditioning apparatuses includes an air conditioning apparatus with a defrost function capable of carrying out a defrost operation during a heating operation. The information acquisition unit acquires determination information used in determination for the start of the defrost operation from the air conditioning apparatus with a defrost function. The distribution information generation unit predicts the start of the defrost operation by the air conditioning apparatus with a defrost function based on the determination information acquired by the information acquisition unit, and calculates the probability such that the probability increases for the air conditioning apparatus with a defrost function predicted to start the defrost operation.

Here, the "determination information used in determination for the start of the defrost operation" is not particularly limited, and, for example, may be a surface temperature of an outdoor heat exchanger provided to an outdoor unit, an outside temperature, or the like.

When the predetermined condition is satisfied such that the defrost operation is carried out while the air conditioning apparatus with a defrost function carries out the heating operation, heating is not carried out indoors during the defrost operation, and hence it becomes more possible for the power consumption amount to increase through the user more easily feeling uncomfortable because the room is too cold, and therefore increasing the output of the air conditioning apparatus with a defrost function, or a similar situation. To deal with this issue, with the management apparatus for the air conditioning apparatuses according to this aspect, when the distribution information generation unit predicts that the air conditioning apparatus with a defrost function will start the defrost operation based on the determination information, the distribution information generation unit performs calculation such that the probability of the air conditioning apparatus with a defrost function canceling the power consumption amount adjustment request increases. With this configuration, by performing calculation such that the probability of cancellation increases in a state in which the air conditioning apparatus with a defrost function is predicted to start the defrost operation, it is possible to more accurately identify the air conditioning apparatus that is to cancel.

A management apparatus for the air conditioning apparatuses according to a fourth aspect of the present invention is the management apparatus for the air conditioning apparatuses according to the first to third aspects of the present invention, in which the information acquisition unit further acquires history information of cancellation of the power consumption amount adjustment request for each of the air conditioning apparatuses. The distribution information generation unit updates the distribution information based on both the current state information and the history information acquired by the information acquisition unit. The distribution information generation unit updates the distribution information such that the distribution amount is preferentially allocated to an air conditioning apparatus determined to have a low frequency of canceling the power consumption amount adjustment request based on the history information.

With the management apparatus for the air conditioning apparatuses according to this aspect, the distribution information generation unit updates the distribution information such that the distribution amount is preferentially allocated to the air conditioning apparatus determined to have a low frequency of canceling the power consumption amount adjustment request. With this configuration, cooperation of an air conditioning apparatus that is not likely to cancel the power consumption amount adjustment request can be guaranteed, and hence it is possible to stably accede to the power consumption amount adjustment request.

Advantageous Effects of Invention

With the management apparatus for a plurality of air conditioning apparatuses according to the first aspect of the present invention, even when there is a power consumption amount adjustment request from the agent on the power supply side, it is possible to finish the allocation processing for distribution to accede to the adjustment request up until that time point, to thereby stably accede to the power consumption amount adjustment request.

With the management apparatus for a plurality of air conditioning apparatuses according to the second aspect of the present invention, it is possible to more accurately identify an air conditioning apparatus that is to cancel.

With the management apparatus for a plurality of air conditioning apparatuses according to the third aspect of the present invention, it is possible to perform calculation such that the probability of cancellation increases in the state in which the air conditioning apparatus with a defrost function is predicted to start the defrost operation, to thereby more accurately identify the air conditioning apparatus that is to cancel.

With the management apparatus for a plurality of air conditioning apparatuses according to the fourth aspect of the present invention, cooperation of the air conditioning apparatus that is not likely to cancel the power consumption amount adjustment request can be guaranteed, and hence it is possible to stably accede to the power consumption amount adjustment request.

BRIEF DESCRIPTION OF THE DRAWINGS

FIG. 5 is a diagram for illustrating examples of planned DR responses for each consumer.

DESCRIPTION OF EMBODIMENTS

An embodiment of the present invention is described below, but the present invention is not limited to the embodiment.

(1) Schematic Configuration of Entire Information Processing System

Figure 1:
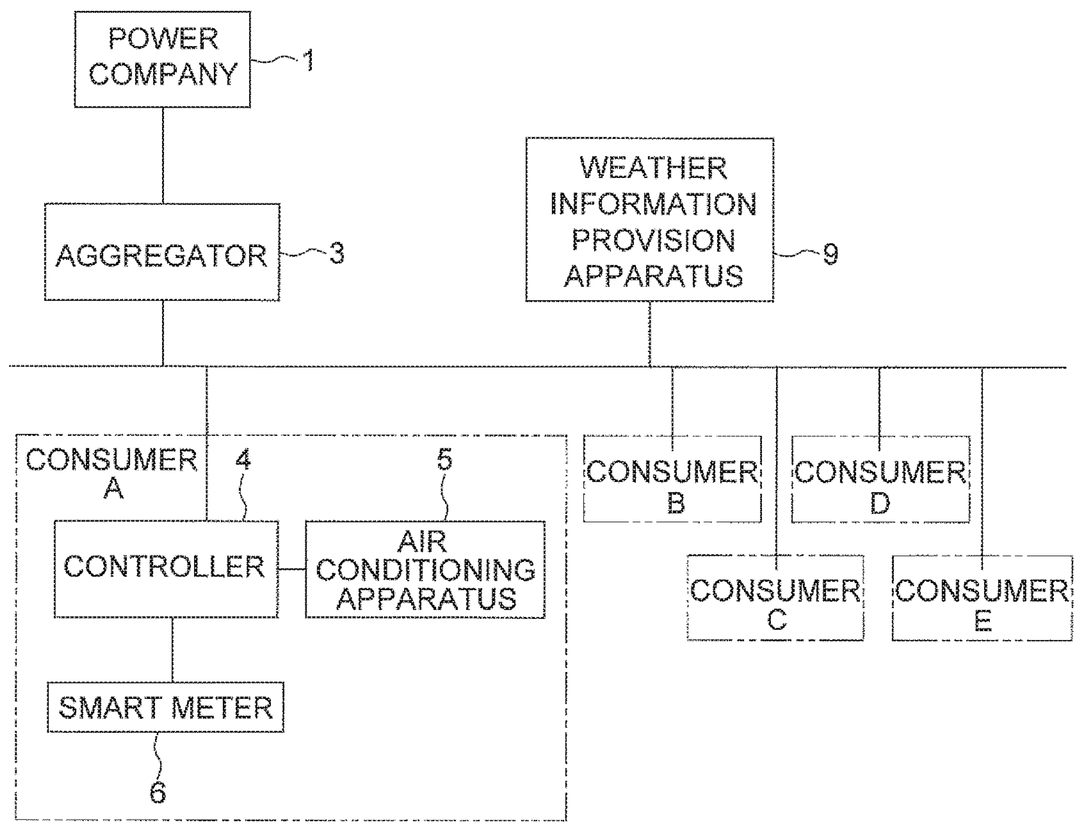
FIG. 1 is a schematic configuration diagram of an entire information processing system including an aggregator according to an embodiment of the present invention.

FIG. 1 is a schematic configuration diagram of an entire information processing system.

A power company 1 is a company that supplies generated power to each of a plurality of consumers.

An aggregator 3 is connected between controllers 4 respectively owned by consumers A to E in a communicable manner, and is configured to manage operation of air conditioning apparatuses 5 respectively owned by the consumers A to E. The aggregator 3 is also connected to the power company 1 in a communicable manner, and receives an instruction for a power consumption amount adjustment request from the power company 1 during periods of tight electricity supply. Although omitted from this description, there is also another aggregators or large-scale properties configured to accept the instruction for the power consumption amount adjustment request from the power company 1. By acceding to the adjustment request with higher reliability than the above-mentioned aggregator and large-scale property, the aggregator 3 according to this embodiment aims to enable priority processing of the power consumption amount adjustment request from the power company 1.

The consumers A to E are managed and controlled by the aggregator 3. Each consumer individually has a controller 4, an air conditioning apparatus 5, and a smart meter 6. Generally, there is an unlimited number of consumers larger than described herein. Each of the controllers 4 respectively belonging to the consumers A to E is connected to the corresponding air conditioning apparatus 5 and the corresponding smart meter 6 of that consumer, and is also connected to the aggregator 3. Each of the air conditioning apparatuses 5 of the consumers A to E is driven through consuming power supplied from the power company 1, to thereby condition air in a target space.

A weather information provision apparatus 9 is connected to the aggregator 3 in a communicable manner, and is configured to provide via communication weather information on each of regions to the aggregators, respectively. More specifically, the weather information provision apparatus 9 according to this embodiment provides information on predicted temperatures for each of time periods in each region.

With the above-mentioned configuration, the power company 1 issues a request (the power consumption amount adjustment request) for demand control for adjusting the power consumption amount in order to avoid a state in which the amount of power supplied is in deficit when the amount of power supplied by the power company 1 is tight as a result of the power consumption amount temporarily increasing due to, for example, many apparatuses that consume electric power, such as air conditioning apparatuses, operating at once.

Here, the aggregator 3 is configured to manage not a single consumer but the plurality of consumers A to E. and thus, compared to a case in which the aggregator 3 manages a single consumer, it is possible to further increase the range of power consumption amount that can be adjusted. Further, when the aggregator 3 receives the power consumption amount adjustment request issued by the power supply company 1, for example, when the power consumption amount adjustment request is a power consumption amount reduction request, reduction of the power consumption amount is carried out by a consumer who is able to cooperate with the reduction among the consumers A to E who are managed by the aggregator 3. In this case, the consumer who has provided the cooperation is granted with an incentive such as, for example, being granted with lower power rates, or being granted money.

The consumers A to E managed by the aggregator 3 are not obligated to respond to the power consumption amount adjustment request issued by the power company 1, and may freely participate as they wish, such that the consumers who desire the incentive would participate. Further, any consumer may cancel the power consumption amount adjustment request in a time period in which the consumer applied to participate. In such a case, a predetermined penalty (increase in power rate, or the like) is imposed on the consumer.

Here, the aggregator 3 obtains in advance from each consumer, through the consumer reporting, plan information on whether or not the consumer will accede (when the consumer will accede, information on how much the consumer will accede) to the power consumption amount adjustment request such that the aggregator 3 can complete to the furthest extent possible processing of the adjustment request within an adjustable range with the consumer managed by the aggregator 3 when the aggregator 3 receives the power consumption amount adjustment request from the power company 1. However, it is not always the case that the consumers operate their air conditioning apparatus 5 according to a plan submitted in advance, and, even when the power company 1 has issued the power consumption amount adjustment request, the planned power consumption amount adjustment may not be possible due to a change in the consumer's plans or a change in weather. Therefore, it is desired that the aggregator 3 take into consideration not only plan information obtained in advance from each of the consumers but also information on a factor of a change that may occur in the future, to thereby determine the adjustable power consumption amount in a highly reliable manner as the aggregator 3 as a declared reduction amount (amount of power consumption able to be reduced), and declare that declared reduction amount to the power company 1 in advance. Specifically, the aggregator 3 specifies as information to be used for declaration to the power company 1 both the adjustable amount determined based on, for example, the plan information each consumer reported in advance, and the power consumption amount (declared reduction amount) obtained by subtracting the factor of the change that may occur in the future from the adjustable amount.

However, when the aggregator 3 takes the factor of the change that may occur in the future too much into consideration, the declared reduction amount that the aggregator 3 can declare to the power company 1 becomes disadvantageously small. As a result, each consumer that is managed by the aggregator 3 receives a smaller incentive for acceding to the power consumption amount adjustment request.

In light of the above, it is desired that the aggregator 3 determines the factor of the change that may occur in the future as accurately as possible (avoid making the factor of the change unnecessarily large), and specify a declared reduction amount having a reduced factor amount that is deducted from the adjustable amount determined based on the plan information and the like reported in advance by each consumer, to thereby enable the consumer managed by the aggregator 3 to obtain the largest incentive possible.

The method of granting the incentive herein is not particularly limited, and may include, for example, the power company 1 granting the incentive to each consumer in accordance with details of a contract, or the aggregator 3 granting an incentive that has been granted to the aggregator 3 by the power company 1 to each consumer managed by the aggregator 3.

For ease of understanding herein, a case in which each the consumers have an air conditioning apparatus 5 that is equal in operating capacity (horse power) to one another, and the power consumption amount adjustment request and each type of schedule is set for every hour is taken as an example, but the present invention is not limited thereto.

(2) Configuration of Air Conditioning Apparatus 5

Figure 2:
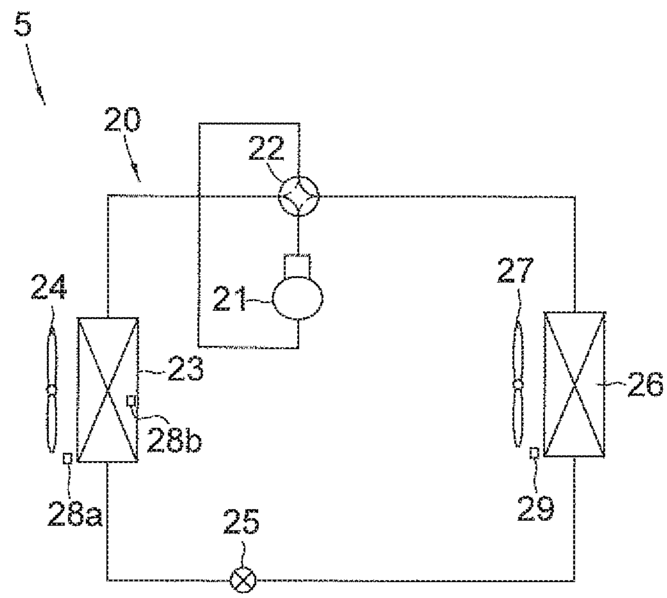
FIG. 2 is a schematic configuration diagram of an air conditioning apparatus.

FIG. 2 is a schematic configuration diagram of the air conditioning apparatus 5 owned by each of the consumers A to E.

Figure 3:
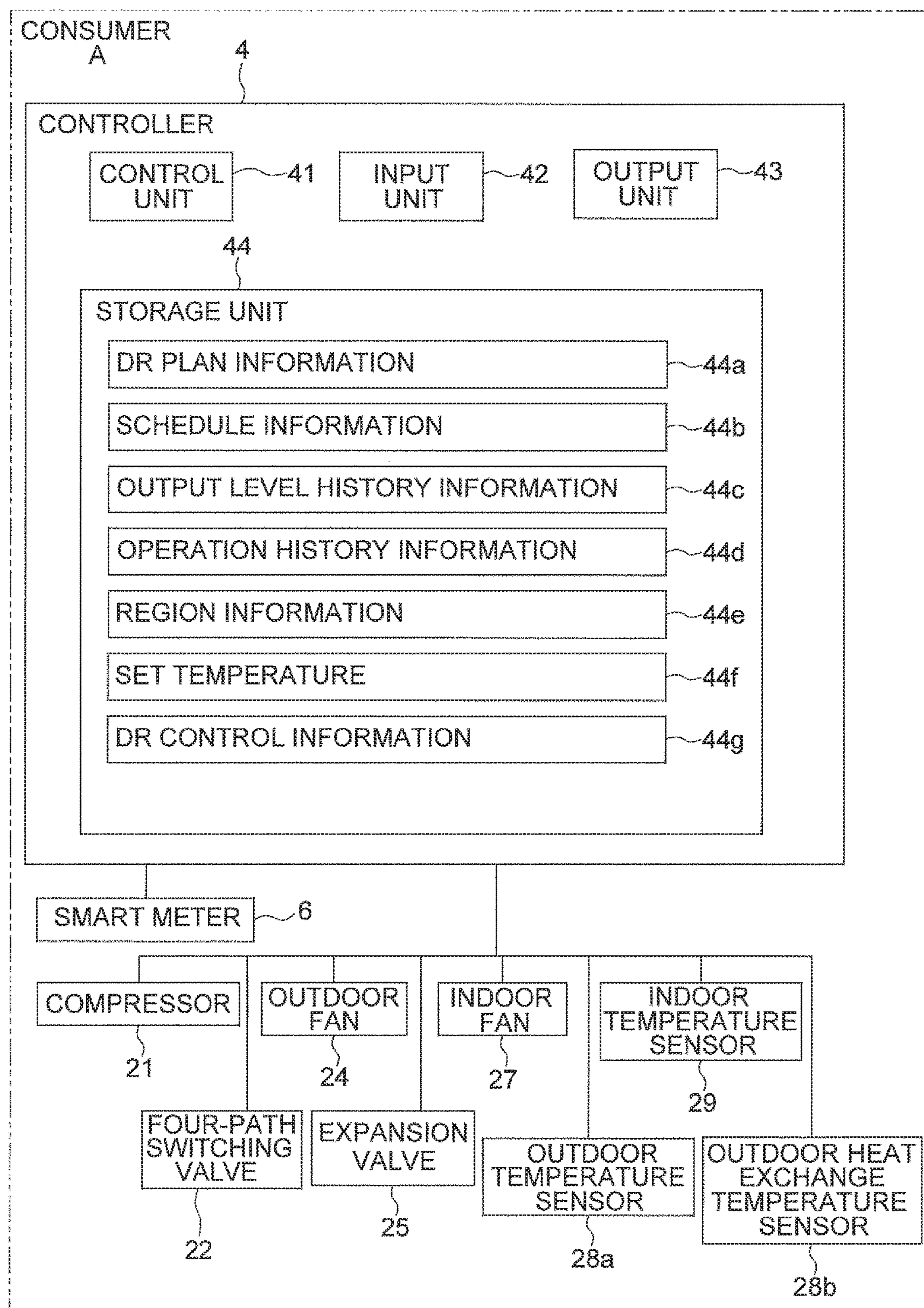
FIG. 3 is a block diagram of a controller, the air conditioning apparatus, and a smart meter of a consumer A.

Further, FIG. 3 is a block diagram of the controller 4, the air conditioning apparatus 5, and the smart meter 6 of the consumer A.

The air conditioning apparatus 5 includes a refrigerant circuit 20, and various temperature sensors 28*a*, 28*b*, and 29.

The refrigerant circuit 20 includes a compressor 21 that can control frequency, a four-path switching valve 22 that can switch a connection state to switch between a cooling operation and a heating operation, an outdoor heat exchanger 23, an outdoor fan 24 capable of controlling air flow quantity, an expansion valve 25 capable of controlling a valve opening position, an indoor heat exchanger 26, and an indoor fan 27 capable of controlling air flow quantity. Each of these components is connected to each other in the order stated. Among these components, the compressor 21, the four-path switching valve 22, the outdoor fan 24, the expansion valve 25, and the indoor fan 27 are connected to the controller 4, and carry out various types of control via a control unit 41 of the controller 4. Specifically, the compressor 21 can adjust a degree of compression of the refrigerant by controlling a drive frequency in accordance with an instruction from the control unit 41. Further, the four-path switching valve 22 can switch the connection state in accordance with an instruction from the control unit 41, to thereby switch between the cooling operation and the heating operation. The outdoor fan 24 and the indoor fan 27 can each control the air flow quantity in accordance with an instruction from the control unit 41. The expansion valve 25 can control a decompression degree of the refrigerant by controlling the opening position of the valve through which the refrigerant passes in accordance with an instruction from the control unit 41.

The refrigerant circuit 20 includes the four-path switching valve 22, and hence can switch between the cooling operation and the heating operation.

During the cooling operation, the refrigerant discharged from the compressor 21 passes through the four-path switching valve 22, undergoes heat exchange with outside air that is sent from the outdoor fan 24, and is sent to the outdoor heat exchanger 23 that functions as a condenser for the refrigerant. The refrigerant condensed by the outdoor heat exchanger 23 is decompressed at the expansion valve 25, undergoes heat exchange with air in the space to be air conditioned that is sent from the indoor fan 27, and is sent to the indoor heat exchanger 26 that functions as an evaporator for the refrigerant. The refrigerant evaporated by the indoor heat exchanger 26 is sent to an intake side of the compressor 21 via the four-path switching valve 22. Through this operation, the space to be air conditioned is cooled.

During the heating operation, the refrigerant discharged from the compressor 21 passes through the four-path switching valve 22, undergoes heat exchange with the air in the space to be air conditioned that is sent from the indoor fan 27, and is sent to the indoor heat exchanger 26 that functions as a condenser for the refrigerant. The refrigerant condensed by the indoor heat exchanger 26 is decompressed at the expansion valve 25, undergoes heat exchange with the outside air that is sent from the outdoor fan 24, and is sent to the outdoor heat exchanger 23 that functions as an evaporator for the refrigerant. The refrigerant evaporated by the outdoor heat exchanger 23 is sent to an intake side of the compressor 21 via the four-path switching valve 22. Through this operation, the space to be air conditioned is heated.

As examples of the various temperature sensors, there are given an outdoor temperature sensor 28*a*, an outdoor heat exchange temperature sensor 28*b*, and an indoor temperature sensor 29. The outdoor temperature sensor 28*a* is provided on an upstream side of the outdoor heat exchanger 23 in a direction of air flow from the outdoor fan 24, and is configured to detect an outside air temperature. The outdoor heat exchange temperature sensor 28*b* is provided in an intermediate position of the outdoor heat exchanger 23, and is configured to detect a temperature of the refrigerant that passes through the intermediate position of the outdoor heat exchanger 23. The indoor temperature sensor 29 is provided on an upstream side of the indoor heat exchanger 26 in a direction of air flow from the indoor fan 27, and is configured to detect a temperature of an indoor space to be air conditioned. These various temperature sensors are all connected to the controller 4, and the control unit 41 of the controller 4 can grasp respective detection values thereof. The control unit 41 is configured to carry out various types of control for the compressor 21, the outdoor fan 24, the expansion valve 25, and the indoor fan 27, and switch the connection state of the four-path switching valve 22 based on detection values in the various temperature sensors.

For example, during the cooling operation, when a temperature detected by the indoor temperature sensor 29 does not satisfy a set temperature received via an input unit 42 of the controller 4, a drive level of the compressor 21 increases in accordance with the degree to which the temperature does not satisfy the set temperature, resulting in more power being consumed and the space to be air conditioned being cooled quickly.

Note that the air conditioning apparatus 5 includes a normal operation control mode and a power saving operation control mode as control modes. The power saving operation control mode is not particularly limited, but is a control mode that takes a longer time than the normal operation control mode when the space to be air conditioned is set to the set temperature, and a control mode in which power consumption per unit time is small.

(3) Configuration of Smart Meter 6

The smart meter 6 is configured to measure the power consumption amount consumed by the air conditioning apparatus 5.

The smart meter 6 is connected to the controller 4, and is configured to transmit information on the measured power consumption amount to the controller 4.

(4) Configuration of Controller 4

As shown in the block diagram of FIG. 3 illustrating the controller 4 and the like of the consumer A, the controller 4 includes the control unit 41, the input unit 42, an output unit 43, a storage unit 44, and other such components. The same applies to the controllers 4 of the consumers B to E.

The control unit 41 is configured to perform various types of control (to be described later) for controlling the power consumption amount of the air conditioning apparatus 5 of the consumer (the consumer A in this embodiment) when the consumer accedes to the power consumption amount adjustment request from the power company 1; processing of storing information on operation from the air conditioning apparatus 5 and information from the smart meter 6 into the storage unit 44; processing of information received from the input unit 42; processing of output to the output unit 43; and other tasks. The control unit 41 is not particularly limited, and may be configured of a CPU, for example.

The output unit 43 is not particularly limited, and, for example, may be a liquid crystal display panel or the like. Information processed by the control unit 41 is displayed on the output unit 43.

The input unit 42 is configured to enable a user or the like to input information to the controller 4. The configuration thereof is not particularly limited, and, for example, may be the liquid crystal display panel of the output unit 43 transformed into a touch panel. The input unit 42 is configured to accept input of various types of information to be described later from the user.

The storage unit 44 is not particularly limited, and may be configured by, for example, a ROM, a RAM, a hard disk, and the like. Various types of information, such as a DR plan information 44*a*, a schedule information 44*b*, an output level history information 44*c*, an operation history information 44*d*, a region information 44*e*, a set temperature 44*f*, and a DR control information 44*g*, and various types of programs to be executed by the control unit 41 are stored in the storage unit 44.

The DR plan information 44*a* includes information on a date and time at which, when the power company 1 has issued the power consumption amount adjustment request, the adjustment request is to be acceded, and information indicating a power consumption amount planned to be reduced in a time period in which the adjustment request is to be acceded if the adjustment request is to be acceded. The DR plan information 44*a* is stored or updated when input from the user (for example, the consumer) is received via the input unit 42. In this embodiment, for example, each user can report a plan to the aggregator 3 through input via the input unit 42 such that the DR plan information 44*a* for a week into the future is constantly stored. This DR plan information 44*a* corresponds to data on one consumer as illustrated in FIG. 5, for example. DR herein refers to an abbreviation of "demand response."

The schedule information 44*b* is information indicating planned use of the air conditioning apparatus 5 by the user, and, for example, includes information on a planned date and time at which the air conditioning apparatus 5 is to be operated, and a planned date and time at which the air conditioning apparatus 5 is not to be operated. The schedule information 44*b* further includes information indicating a planned date and time at which the air conditioning apparatus 5 is to be operated not in the normal operation control mode but the power saving operation control mode. The schedule information 44*b* further includes information indicating a plan for the set temperature. This schedule information 44*b* is stored or updated when input from the user is received via the input unit 42.

The output level history information 44*c* is past information on the air conditioning apparatus 5 relating to a ratio of output to rated power consumption previously determined for the air conditioning apparatus 5. In this embodiment, average information on the ratio of output per hour to past rated power consumption is stored. The control unit 41 can grasp the ratio of output (%) to the rated power consumption from a value measured by the smart meter 6. Specifically, for example, the ratio of output is determined to be 100% when the air conditioning apparatus 5 is operated for one hour at the rated power consumption, 0% when the air conditioning apparatus 5 is not operated for one hour, and 50% when the air conditioning apparatus 5 is operated for 30 minutes of one hour at the rated power consumption and stopped for the remaining 30 minutes.

The operation history information 44*d* includes each of the various information on the air conditioning apparatuses 5. Specifically, the operation history information 44*d* is information indicating power consumption amount history (history of values measured by the smart meter 6) of the air conditioning apparatus 5, and includes information indicating the power consumption amount of the air conditioning apparatus 5 at each day and time. The operation history information 44*d* further includes information on an outside air temperature of the air conditioning apparatus 5.

The region information 44*e* is information indicating a region in which the corresponding air conditioning apparatus 5 directly connected to the controller 4 is located, and is stored when input from the user is received via the input unit 42. For example, the region information 44*e* may be information indicating an address of the corresponding air conditioning apparatus 5.

The set temperature 44*f* is information on a set temperature, which is a target temperature when the air conditioning apparatus 5 is operated, and is stored or updated when input from the user is received via the input unit 42.

The DR control information 44*g* is information indicating details of control of the air conditioning apparatus 5 which is to be carried out when the power company 1 has issued the power consumption amount adjustment request, and the adjustment request is to be acceded. For example, information for carrying out control of gradually increasing the set temperature in accordance with the power consumption amount to be reduced when a specific power consumption amount is to be reduced during the cooling operation; control of gradually decreasing the set temperature in accordance with the power consumption amount to be reduced when a specific power consumption amount is to be reduced during the heating operation; control of stopping operation when the specific power consumption amount cannot be reduced by changing the set temperature; and the like is stored. Due to this configuration, the control unit 41 of the controller 4 of the consumer, which has received a reduction instruction for power consumption from the aggregator 3, performs processing of gradually changing the set temperature until the power consumption amount planned to be reduced previously determined in the DR plan information 44*a* can be reduced, and processing of stopping operation when the previously determined power consumption amount planned to be reduced cannot be reduced by only changing the set temperature.

(5) Configuration of Aggregator 3

Figure 4:
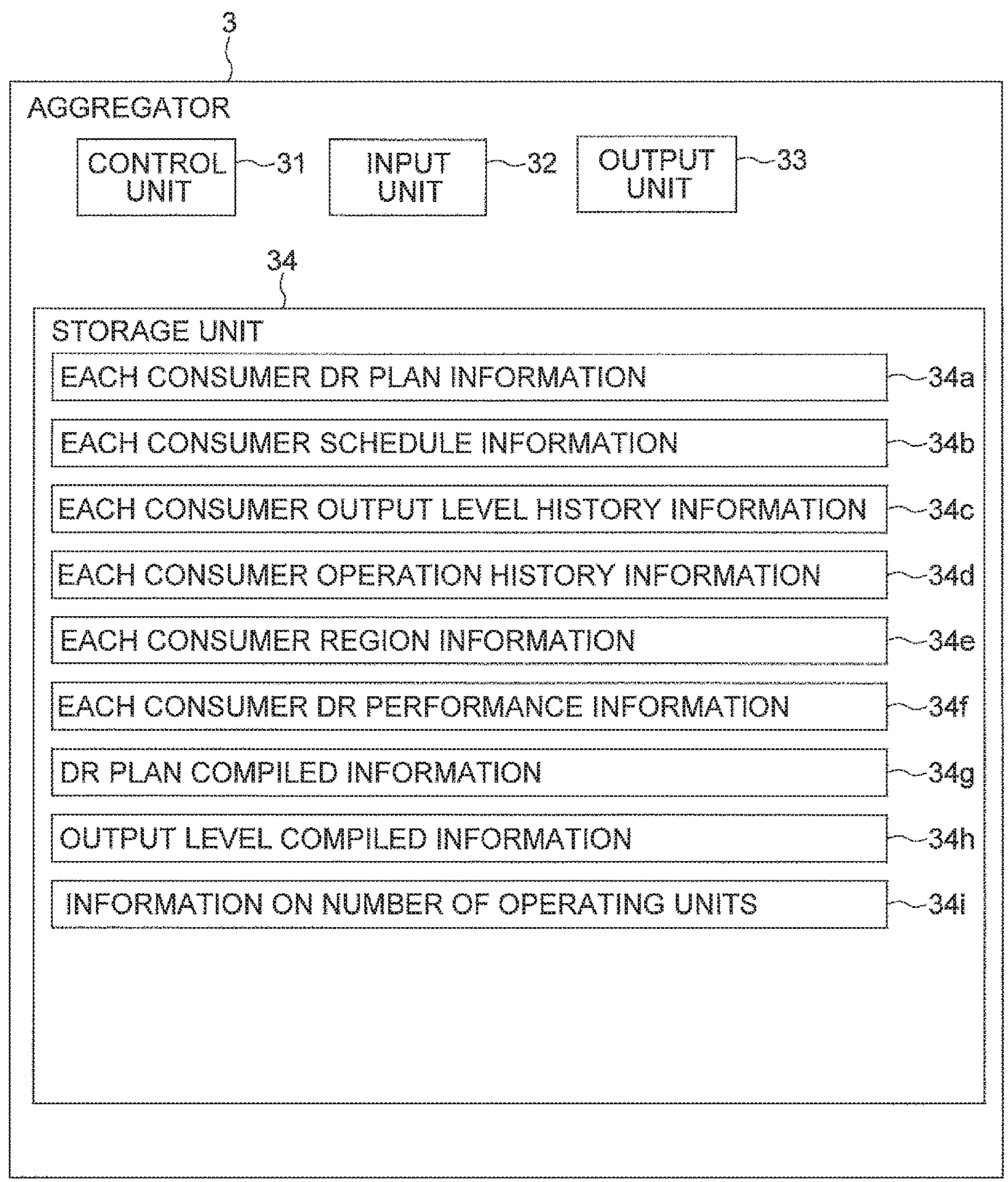
FIG. 4 is a block diagram of the aggregator.

FIG. 4 is a block diagram of the aggregator 3.

The aggregator 3 includes a control unit 31, an input unit 32, an output unit 33, a storage unit 34, and other components.

The control unit 31 is configured to perform various types of processing (to be described in detail later) for managing and controlling the power consumption amounts of the consumers A to E, who are managed in order to be able to accede to the power consumption amount adjustment request from the power company 1; processing of collecting information of states relating to each of the air conditioning apparatuses 5 of the consumers A to E; processing of generating information based on the collected information; processing of storing the generated information in the storage unit 34; processing for information received from the input unit 32; processing of output to the output unit 33; and other types of processing. The control unit 31 is not particularly limited, and, for example, may be configured by a CPU.

The output unit 33 is not particularly limited, and may be, for example, a liquid crystal display panel. Information processed by the control unit 31 is displayed on the output unit 33.

The input unit 32 is configured to allow a manager of the aggregator 3 to input information to the aggregator 3. The input unit 32 is not particularly limited, and may be, for example, the liquid crystal display panel of the output unit 33 transformed into a touch panel. The input unit 32 is configured to accept input of various types of information from the manager of the aggregator 3.

The storage unit 34 is not particularly limited, and may be configured by, for example, a ROM, a RAM, a hard disk, and other components. Various types of information, such as each consumer DR plan information 34*a*, each consumer schedule information 34*b*, each consumer output level history information 34*c*, each consumer operation history information 34*d*, each consumer region information 34*e*, each consumer DR performance information 34*f*, a DR plan compiled information 34*g*, an output level compiled information 34*h*, and an information on number of operating units 34*i*; and various types of programs to be executed by the control unit 31 are stored in the storage unit 34.

Among the types of information described below, the information that is updated by each of the consumer is acquired as necessary by the control unit 31 through communication, rewritten as new information in the storage unit 34, and information is generated and processed as necessary based on this rewritten information.

Each consumer DR plan information 34*a* is information that is a compilation of the DR plan information 44*a* on all of the consumers A to E. Each consumer DR plan information 34*a* is generated through the control unit 31 periodically obtaining and collecting the DR plan information 44*a* on all of the consumers A to E through communication, and is stored in the storage unit 34. Specifically, as illustrated in FIG. 5, each consumer DR plan information 34*a* is information indicating the power consumption amount planned to be reduced by each consumer.

Each consumer schedule information 34*b* is information that is a compilation of the schedule information 44*b* on all of the consumers A to E. Each consumer schedule information 34*b* is generated through the control unit 31 periodically obtaining and collecting the schedule information 44*b* on all of the consumers A to E through communication, and is stored in the storage unit 34.

Each consumer output level history information 34*c* is information that is a compilation of the output level history information 44*c* on all of the consumers A to E. Each consumer output level history information 34*c* is generated through the control unit 31 periodically obtaining and collecting the output level history information 44*c* on all of the consumers A to E through communication, and is stored in the storage unit 34.

Each consumer operation history information 34*d* is information that is a compilation of the operation history information 44*d* on all of the consumers A to E. Each consumer operation history information 34*d* is generated through the control unit 31 periodically obtaining and collecting the operation history information 44*d* on all of the consumers A to E through communication, and is stored in the storage unit 34.

Each consumer region information 34*e* is information that is a compilation of the region information 44*e* on all of the consumers A to E. Each consumer region information 34*e* is generated through the control unit 31 periodically obtaining and collecting the region information 44*e* on all of the consumers A to E through communication, and is stored in the storage unit 34.

Each consumer DR performance information 34*f* is information indicating the response performance of each of the consumers A to E with regard to past power consumption amount adjustment requests. Specifically, each consumer DR performance information 34*f* is information indicating whether or not the power consumption amount was actually able to be reduced as planned when the power consumption amount adjustment request was transmitted from the power company 1 to each consumer in a time period indicated in the DR plan information 44*a* that the consumer reported themselves. Each consumer DR performance information 34*f* is not particularly limited, and may be, for example, a ratio of time in which the power consumption amount was able to be reduced as planned (for example, when five one-hour power consumption amount adjustment requests are transmitted, and reduction as planned was achieved for three of those power consumption amount adjustment requests, the ratio can be set to 60%.)

Figure 6:
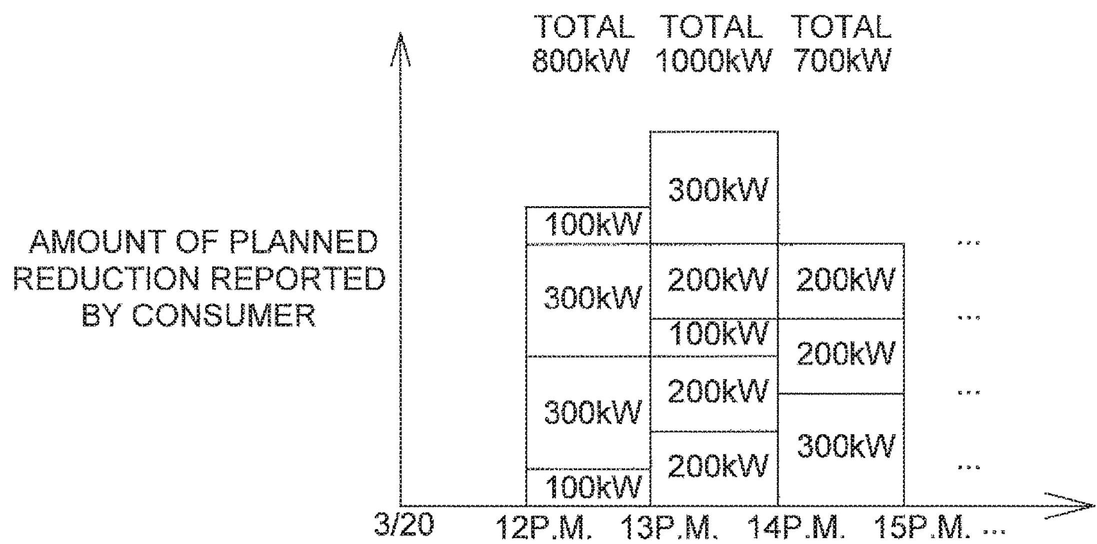
FIG. 6 is a diagram for illustrating examples of planned reductions of power consumption amount obtained from the planned DR responses for each consumer.

The DR plan compiled information 34*g* is information that is generated by the control unit 31 based on the consumer DR plan information 34*a*. Specifically, as illustrated in FIG. 6, the DR plan compiled information 34*g* is information that can be obtained by determining, for each date and time, a total amount (planned reduction amount) of the power consumption amount planned to be reduced that is reported by each consumer grasped from the consumer DR plan information 34*a*. With this configuration, it is possible to grasp a future planned reduction amount of power consumption based on the reports from each of the consumers managed by the aggregator 3.

The output level compiled information 34*h* is information that is generated by the control unit 31 based on the consumer output level history information 34*c*. Specifically, the output level compiled information 34*h* is information that is obtained by extracting only information (information in which the output level is anything other than 0: information in which there was an operation) in which an output level is present from among information on past output levels of the air conditioning apparatuses 5 of the consumers A to E, and corresponding the output level with information on the corresponding date and time. The control unit 31 performs the extraction of the information in this embodiment. With this configuration, it is possible to grasp the output levels of the air conditioning apparatuses 5 of the consumers A to E when they were operated in the past through corresponding the output levels to the information on the date and time.

The information on number of operating units 34*i* is information that is generated by the control unit 31 based on the consumer operation history information 34*d*. Specifically, the information on number of operating units 34*i* is information that indicates, for each date and time, the total number of operating units of the air conditioning apparatuses 5 of the consumers managed by the aggregator 3 on a past time period (a one hour period in this embodiment). In this embodiment, the control unit 31 determines whether or not the air conditioning apparatus 5 was driven in the past time period based on the consumer operating history information 34*d*. In this embodiment, when there was a time within the one hour period at which the air conditioning apparatus 5 was driven (when the smart meter 6 has measured consumption of power within the one hour period), the control unit 31 determines that the air conditioning apparatus 5 was operated, and counts one unit as operated. The control unit 31 is not limited to the above configuration, and may count that there was operation when the power consumption amount in the time period is larger than a reference amount.

(6) Processing of Power Consumption Amount Adjustment Request by Aggregator 3

The control unit 31 of the aggregator 3 performs processing of specifying, for every future date and time, the "declared reduction amount" of the power consumption that can be acceded with the aggregator 3 before the power consumption amount adjustment request is issued by the power company 1 in the future. The control unit 31 then declares in advance information on the specified "declared reduction amount" of the power consumption to the power company 1 (sends the information via communication to the power company 1).

Here, the control unit 31 of the aggregator 3 tentatively determines (in advance), at a stage one hour prior to a predetermined time in advance, corresponding content (planned allocation of a reduction load, or the like) when the power consumption amount adjustment request is accepted during a predetermined time interval (one hour in this embodiment) from a time point of the predetermined time in advance (in this embodiment, a future time point one hour in advance). In other words, the control unit 31 of the aggregator 3 performs processing of tentatively determining, in advance, content of a response (the planned allocation of the reduction load, or the like) to the power consumption amount adjustment request one hour after the current time point based on information that has been collected from the controllers 4 of each of the consumers up until the current time point.

In the description herein, the control unit 31 of the aggregator 3 performs processing of redistributing the reduction amount when it becomes difficult for one of the air conditioning apparatuses 5 of the consumers that is managed to reduce the power consumption amount as planned after the corresponding content is tentatively determined in advance (Steps S11 to S16).

Figure 7:
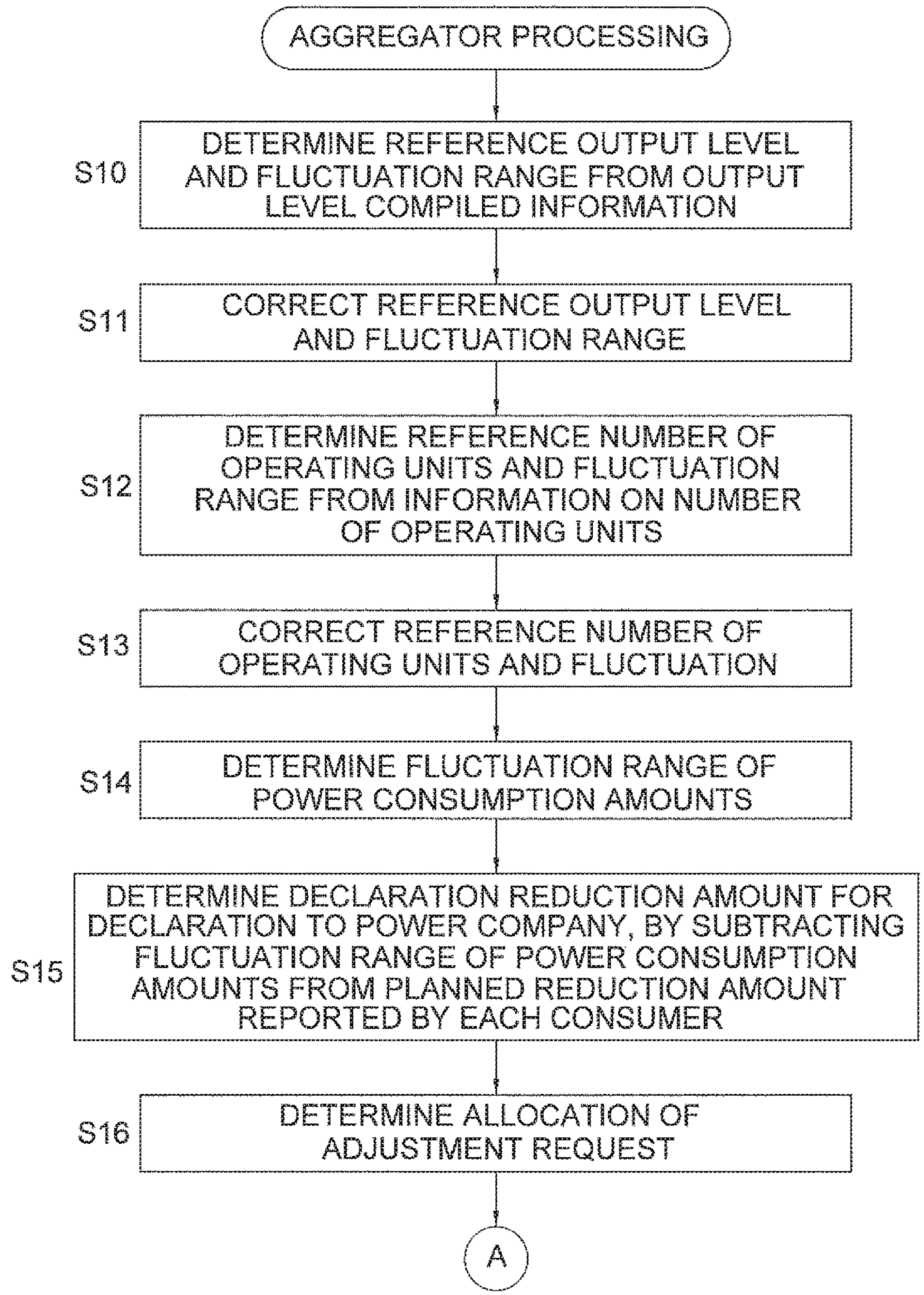
FIG. 7 is a (first) flowchart for illustrating processing of the aggregator.
Figure 8:
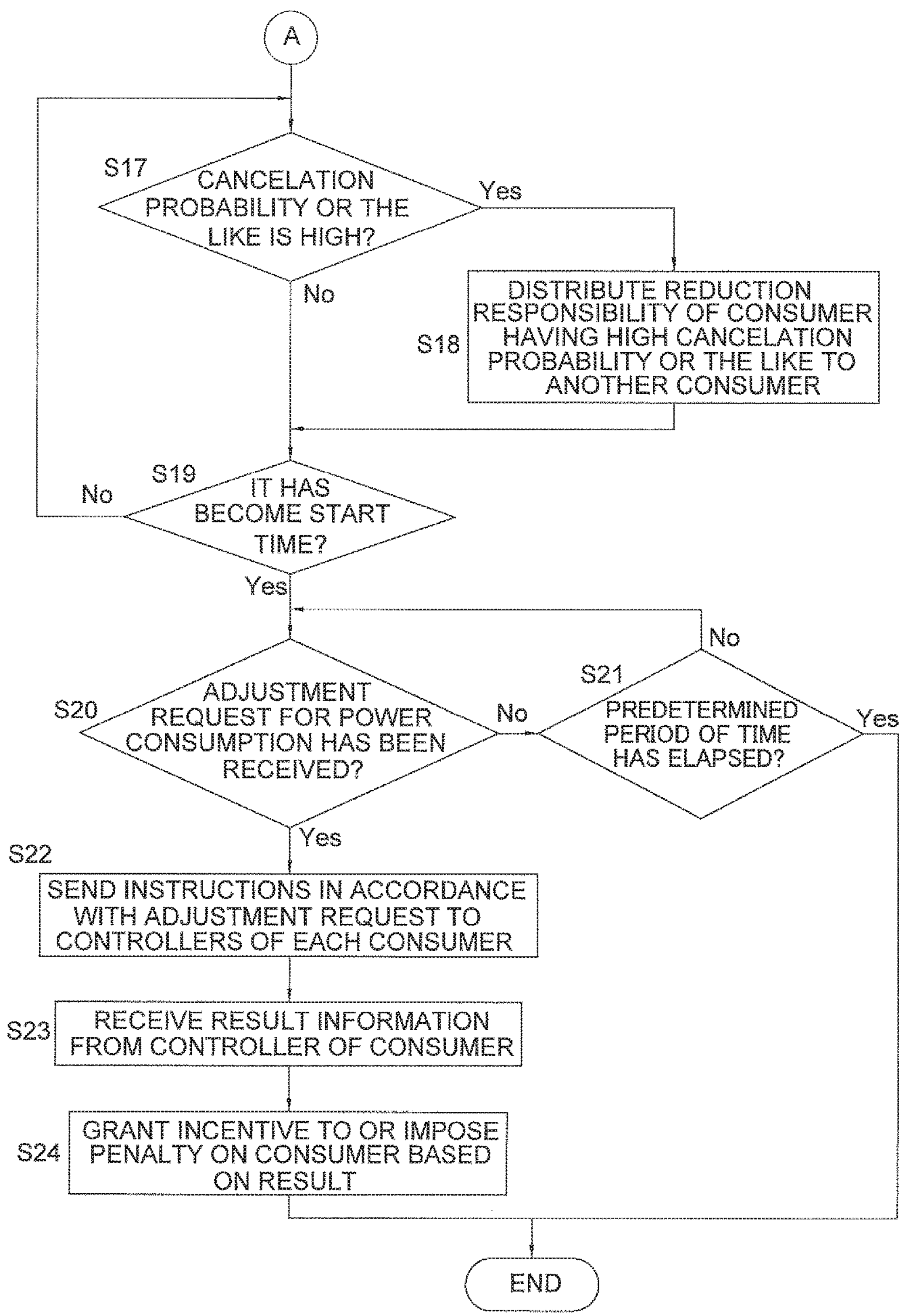
FIG. 8 is a (second) flowchart for illustrating the processing of the aggregator.

FIG. 7 and FIG. 8 are flowcharts for illustrating the processing of the aggregator 3.

Herein, processing that begins at 12 p.m. on March 20$^{th}$ to define the content corresponding to the power consumption amount adjustment request in a time period from 1 p.m. to 2 p.m. on March 20$^{th}$ is described as an example of the processing. The processing described below is performed at each of predetermined times. For example, the processing that begins at 12 p.m. on March 20$^{th}$ to define the content corresponding to the power consumption amount adjustment request in the time period from 1 p.m. to 2 p.m. on March 20$^{th}$, processing that begins at 1 p.m. on March 20$^{th}$ to define the content corresponding to the power consumption amount adjustment request in the time period from 2 p.m. to 3 p.m. on March 20$^{th}$, processing that begins at 2 p.m. on March 20$^{th}$ to define the content corresponding to the power consumption amount adjustment request in the time period from 3 p.m. to 4 p.m. on March 20$^{th}$, and so forth are all performed independently of one another.

In Step S10, the control unit 31 of the aggregator 3 uses the output level compiled information 34*h* that is stored in the storage unit 34 for a time period of one hour after one hour in the future (for example, when the current time point is 12 p.m. on March 20$^{th}$, the time period from 1 p.m. to 2 p.m. on March 20$^{th}$) to determine an average (reference output level OS) and a distribution range (fluctuation range OL to OH of output levels) of the output levels.

Here, the control unit 31 uses only information that is both information on past predetermined times (times up to 10 days prior in this embodiment) counted back from a future date and time to be determined among the output level compiled information 34*h*, and information on a time period corresponding to a time period of the future date and time to be determined (in the above example, only information on the time period from 1 p.m. to 2 p.m.), to thereby determine the reference output level OS and the fluctuation range OL to OH of output levels. With this configuration, it is possible to grasp recent output trends of all the air conditioning apparatuses 5 of the consumers A to E that are managed by the aggregator 3.

Specifically, the reference output level OS can be obtained by dividing the total number of pieces of information (information that is both information on from March 10$^{th}$ to March 19$^{th}$ with regard to the air conditioning apparatuses 5 of each of the consumers A to E, and information on 1 p.m. to 2 p.m. on each of those days) on all the output levels of the air conditioning apparatuses 5 of each of the consumers A to E for a time period that corresponds to a future date and time (for example, 1 p.m. to 2 p.m. on March 20$^{th}$) among information on a period within a past predetermined period counted back from the future date and time, by the number of pieces of information.

Figure 9:
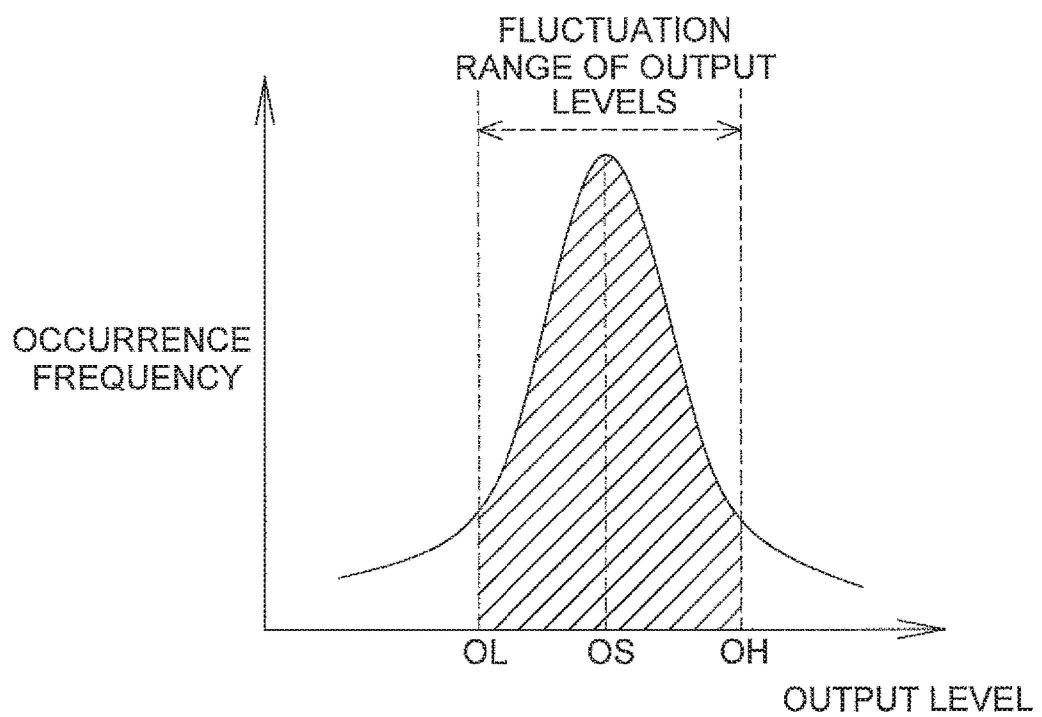
FIG. 9 is a graph for illustrating a reference output level and a fluctuation range of output levels.

Further, as illustrated in FIG. 9, the fluctuation range OL to OH of output levels can be specifically determined as a predetermined range around the reference output level OS in the form of a distribution of occurrence frequency for each output level with regard to the information on all the output levels of the air conditioning apparatuses 5 of each of the consumers A to E for a time period corresponding to a future date and time (for example, 1 p.m. to 2 p.m. on March 20$^{th}$) among information on a period within a past predetermined period counted back from the future date and time.

Here, with regard to an upper limit OH of the fluctuation range OL to OH of output levels, with a plurality of pieces of information exceeding the reference output level OS as information to be counted, an output level of information counted last when a predetermined ratio amount (for example, 30% in this embodiment) of the number of pieces of all the information on the time period that corresponds to the future date and time among the information on the period within the predetermined past period were counted in ascending order is determined as the upper limit OH of the fluctuation range of output levels.

Further, with regard to a lower limit OL of the fluctuation range OL to OH of output levels, with a plurality of pieces of information falling below the reference output level OS as information to be counted, an output level of information counted last when a predetermined ratio amount (for example, 30% in this embodiment) of the number of pieces of all the information on the time period that corresponds to the future date and time among the information on the period within the predetermined past period were counted in descending order is determined as the lower limit OL of the fluctuation range of the output levels.

Here, history information that is included in the output level compiled information 34*h* on the output levels, and that indicates a specific air conditioning apparatus 5 of a specific consumer on a specific date and time is counted as one piece of information.

In Step S11, the control unit 31 of the aggregator 3 corrects the reference output level OS and the fluctuation range OL to OH of output levels obtained in Step S10 based on weather information.

Specifically, for a future date and time (for example, 1 p.m. to 2 p.m. on March 20$^{th}$), the control unit 31 obtains, via communication with the weather information provision apparatus 9, information on predicted temperatures for each of time periods in each of the regions in which the air conditioning apparatuses 5 of the consumers A to E managed by the aggregator 3 are located, adds the temperatures of the predicted temperatures for the regions together, and divides the total by the number of pieces of information on the predicted temperatures. With this, the control unit 31 obtains an average predicted temperature. Then, the control unit 31 determines an average past temperature (outside temperature) for a time period corresponding to a period within the past predetermined time based on the consumer operation history information 34*d*.

Figure 10:
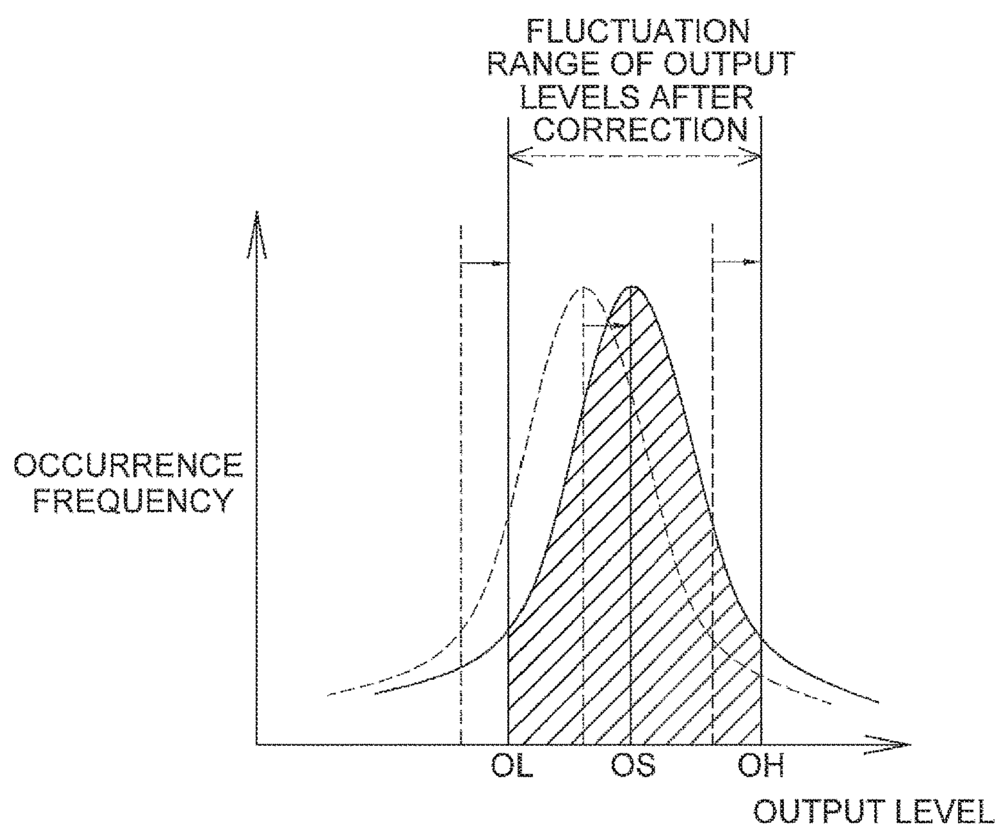
FIG. 10 is a graph for illustrating correction of the reference output level and the fluctuation range of output levels.

Then, the control unit 31 compares the average predicted temperature and the average past temperature, to thereby determine, based on a predetermined determination method, whether an air conditioning load has increased or decreased. As illustrated in FIG. 10, the control unit 31 corrects the reference output level OS and the fluctuation range OL to OH of output levels obtained in Step S10 based on the result of this determination. For example, when cooling is being carried out, the control unit 31 assumes that the air conditioning load increases as the average predicted temperature exceeds the average past temperature, and thus performs correction such that the reference output level OS and the fluctuation range OL to OH of output levels increase.

Further, the control unit 31 finds out the number of air conditioning apparatuses 5 planned to be operated in the power saving operation control mode based on each consumer schedule information 34*b* stored in the storage unit 34, and, for operation at the future date and time, performs correction such that the reference output level OS and the fluctuation range OL to OH of output levels decrease as the ratio of number of air conditioning apparatuses 5 increases.

Further, the control unit 31 finds out an average value of the set temperatures of the air conditioning apparatuses 5 based on each consumer schedule information 34*b* stored in the storage unit 34, and performs correction such that the reference output level OS and the fluctuation range OL to OH of output levels increase as the average value decreases during cooling, and increases during heating.

In Step S12, for a time period of one hour from one hour in the future (for example, the time period from 1 p.m. to 2 p.m. on March 20$^{th}$ when the current time point is 12 p.m. on March 20$^{th}$), the control unit 31 of the aggregator 3 uses the information on number of operating units 34*i* stored in the storage unit 34 to determine an average (reference number of operating units NS) and a distribution range (fluctuation range NL to NH of number of operating units) of the number of operating units.

In this step, the control unit 31 uses only information that is both information on the past predetermined period (period up until 10 days prior in this embodiment) counted back from a future date to be determined among the information on number of operating units 34*i*, and information on a time period that corresponds to a time period of the future date and time to be determined (in the above example, only information on the time period from 1 p.m. to 2 p.m.) to determine the reference number of operating units NS and the fluctuation range NL to NH of number of operating units. With this configuration, it is possible to grasp recent trends of the number of operating units of the air conditioning apparatuses 5 of each of the consumers A to E managed by the aggregator 3.

Specifically, the reference number of operating units NS can be obtained by dividing the total number (total number of operating units) of pieces of information (pieces of information on the number of operating units during the period from 1 p.m. to 2 p.m. on each day of the period from March 10$^{th}$ to 19$^{th}$ for the air conditioning apparatuses 5 of each of the consumers A to E) on the number of operating units of the air conditioning apparatuses 5 of each of the consumers A to E for each day in a time period corresponding to a future date and time (for example, 1 p.m. to 2 p.m. on March 20$^{th}$) in a period within a past predetermined period counted back from the future date and time, by the number of days in the period from March 10$^{th}$ to 19$^{th}$.

Figure 11:
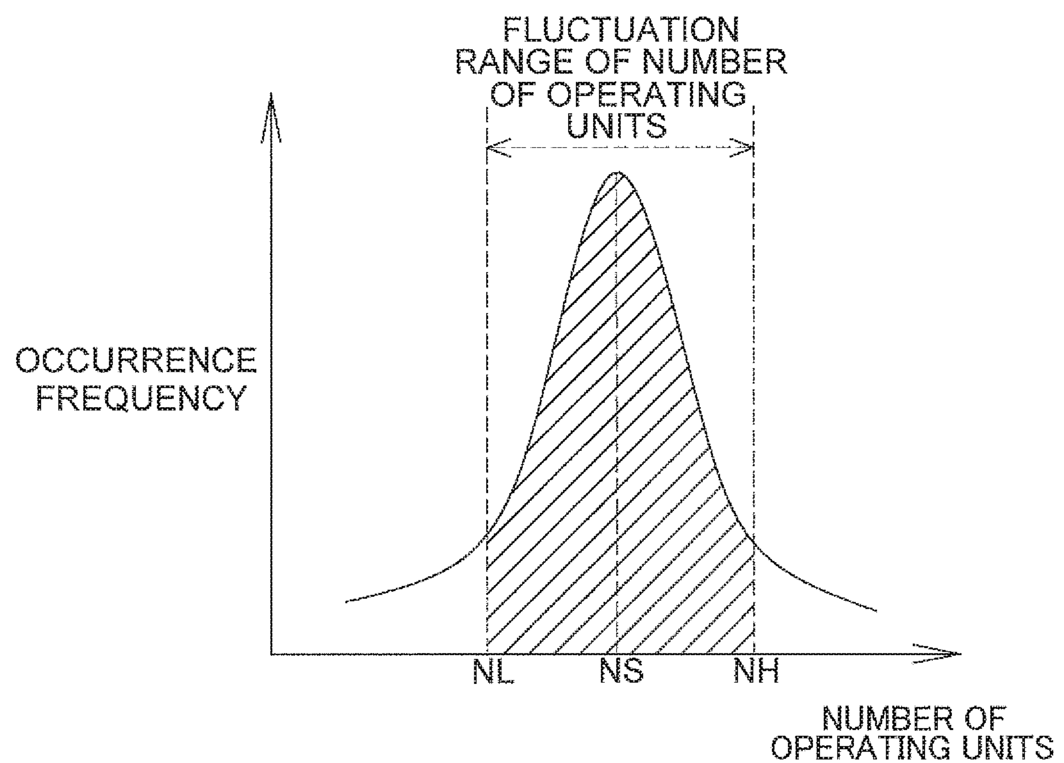
FIG. 11 is a graph for illustrating a reference number of operating units and a fluctuation range of number of operating units.

Further, specifically, as illustrated in FIG. 11, in terms of the information (information on both March 10$^{th}$ to 19$^{th}$ for the air conditioning apparatuses 5 of each of the consumers A to E, and the number of operating units from 1 p.m. to 2 p.m. on each of those days) on the number of operating units of the air conditioning apparatuses 5 of each of the consumers A to E for each of the days in the time period corresponding to the future date and time (for example, 1 p.m. to 2 p.m. on March 20$^{th}$) in a period within the past predetermined period counted back from the future date and time, the fluctuation range NL to NH of number of operating units can be obtained as a predetermined range with respect to the reference number of operating units NS as a distribution of occurrence frequency for each of the number of operating units.

Here, with regard to an upper limit NH of the fluctuation range NL to NH of number of operating units, with a plurality of pieces of information exceeding the reference number of operating units NS as information to be counted, the number of operating units of information counted last when a predetermined ratio amount (for example, 30% in this embodiment) of the number of pieces of all information on the time period that corresponds to the future date and time among the information on the period within the past predetermined period were counted in ascending order is determined as the upper limit NH of the fluctuation range of number of operating units.

Further, with regard to a lower limit NL of the fluctuation range NL to NH of number of operating units, with a plurality of pieces of information falling below the reference number of operating units NS as information to be counted, the number of operating units of information counted last when a predetermined ratio amount (for example, 30% in this embodiment) of the number of pieces of all information on the time period that corresponds to the future date and time among the information on the period within the past predetermined period were counted in descending order is determined as the lower limit NL of the fluctuation range of number of operating units.

In Step S13, the control unit 31 of the aggregator 3 corrects the reference number of operating units NS and the fluctuation range NL to NH of number of operating units obtained in Step S12.

Figure 12:
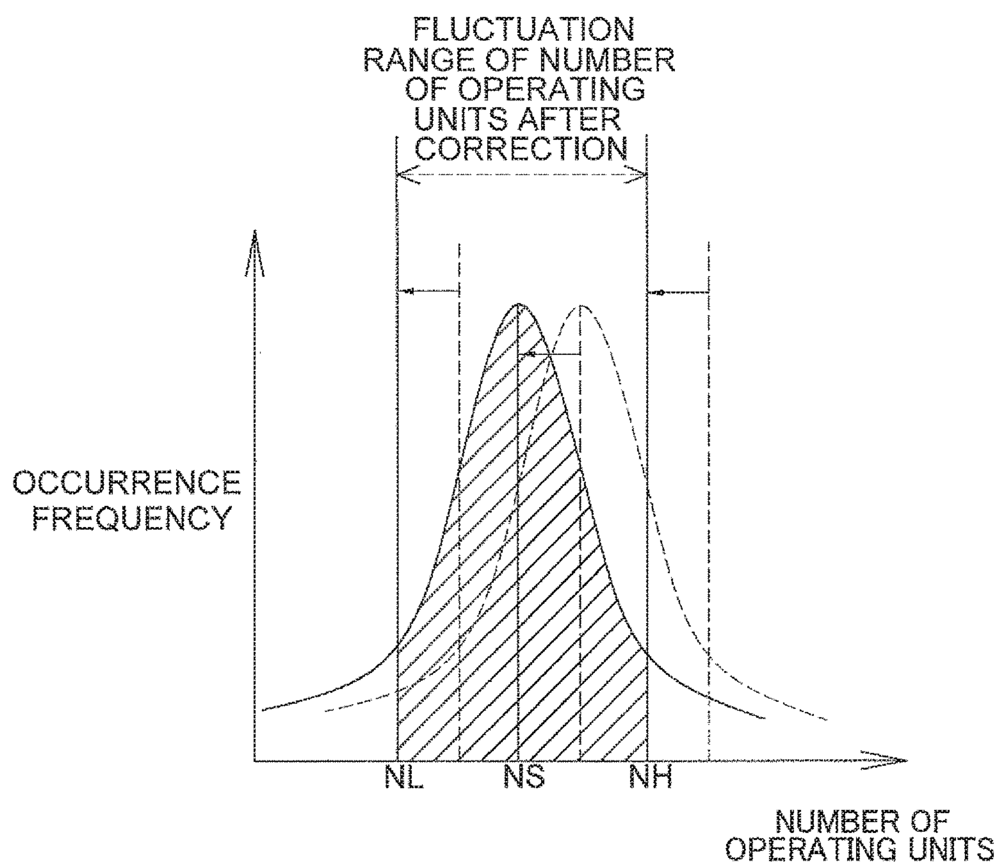
FIG. 12 is a graph for illustrating correction of the reference number of operating units and the fluctuation range of number of operating units.

Specifically, for a future date and time (for example, 1 p.m. to 2 p.m. on March 20$^{th}$), the control unit 31 obtains information on planned operation for the air conditioning apparatuses 5 of each of the consumers on a corresponding future date and time from each consumer schedule information 34*b*, and compares that information with past operation history information. Then, as illustrated in FIG. 12, the control unit 31 corrects the reference number of operating units NS and the fluctuation range NL to NH of number of operating units obtained in Step S12 based on the result of a determination of the comparison.

Specifically, the control unit 31 reads out whether or not there is a planned operation for a certain future date and time from each consumer schedule information 34*b*, to thereby determine a planned number of operating units, which is the number of units of the air conditioning apparatuses 5 planned to be operated among the air conditioning apparatuses 5 of each of the consumers A to E managed by the aggregator 3. Then, the control unit 31 further reads out each consumer operation history information 34*d*, to thereby determine an average past number of operating units, which is an average of the number of operating units in the time period corresponding to the future date and time in the period within the past predetermined period. Note that, for each consumer operation history information 34*d*, the control unit 31 treats information in which there is an output level (the information in which the output level is anything other than 0) as information in which operation occurred. Here, the control unit 31 corrects the reference number of operating units NS and the fluctuation range NL to NH of number of operating units in accordance with a result of comparison between the planned number of operating units and the average past number of operating units. Specifically, for example, the control unit 31 performs correction such that the reference number of operating units NS and the fluctuation range NL to NH of number of operating units increase as the planned number of operating units becomes larger than the average past number of operating units.

Figure 13:
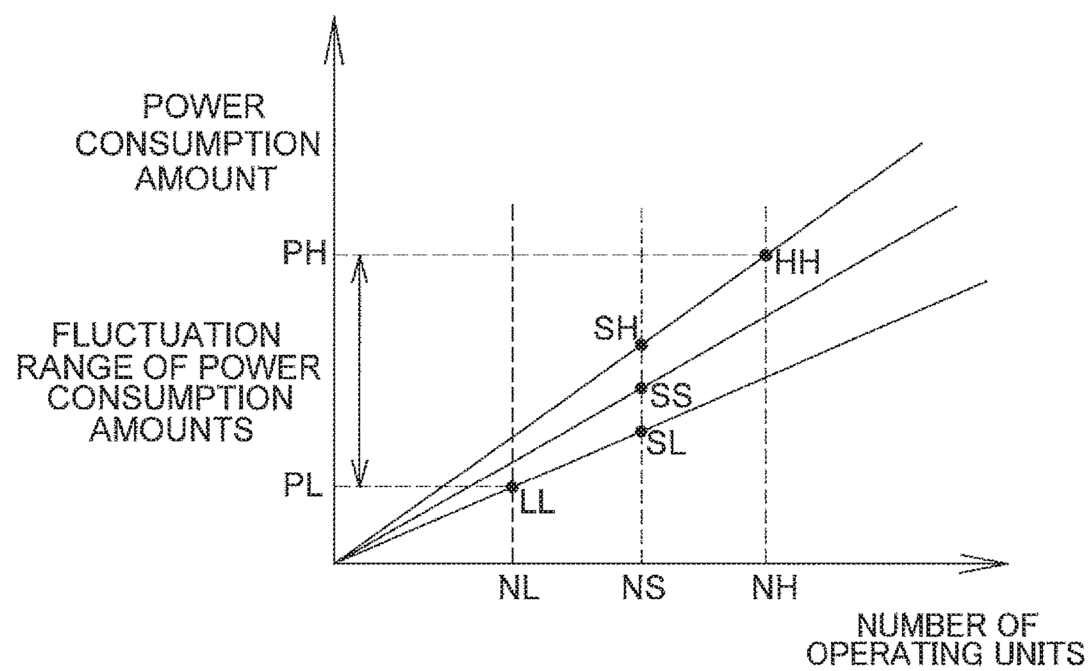
FIG. 13 is a graph for illustrating a fluctuation range of power consumption amounts.

In Step S14, the control unit 31 of the aggregator 3 determines a "fluctuation range of power consumption amounts," which is illustrated in the graph of FIG. 13, based on the reference output level OS (after correction) and the fluctuation range OL to OH of output levels (after correction) obtained in Step S11, and the reference number of operating units NS (after correction) and the fluctuation range NL to NH of number of operating units (after correction) obtained in Step S13.

First, the control unit 31 determines a reference point SS by substituting the reference output level OS and the reference number of operating units NS into a predetermined equation (for example, determines the reference point SS by multiplying the product of those values by a predetermined coefficient). Then, the control unit 31 determines a reference line that passes through both the point of intersection of a power consumption amount 0 and a number of operating units 0, and the reference point SS. The control unit 31 further determines an upper limit point SH by substituting the upper limit OH of the fluctuation range OL-OH of output levels and the reference number of operating units NS into the above-mentioned predetermined equation. In a similar manner, the control unit 31 determines an upper limit line that passes through both the point of intersection of the power consumption amount 0 and the number of operating units 0, and the upper limit point SH. The control unit 31 further determines a lower limit point SL by substituting the lower limit OL of the fluctuation range OL-OH of output levels and the reference number of operating units NS into the above-mentioned predetermined equation. In a similar manner, the control unit 31 determines a lower limit line that passes through both the point of intersection of the power consumption amount 0 and the number of operating units 0, and the lower limit point SL. Then, the control unit 31 determines a power consumption amount at a point (point HH) at which the upper limit line determined in this step and the upper limit NH of the fluctuation range NL-NH of number of operating units overlap as an upper limit PH of the power consumption amount. The control unit 31 further determines a power consumption amount at a point (point LL) at which the lower limit line and the lower limit NL of the fluctuation range NL-NH of number of operating units overlap as a lower limit PL of the power consumption amount. Then, the control unit 31 determines a value obtained by subtracting the lower limit PL of the power consumption amount from the upper limit PH of the power consumption amount as the "fluctuation range of power consumption amounts."

In Step S15, the control unit 31 of the aggregator 3 reads out the DR plan compiled information 34*g* from the storage unit 34, to thereby grasp the planned reduction amount (total amount of power consumption amount planned to be reduced that has been reported by each consumer) for a future date and time (for example, 1 p.m. to 2 p.m. on March 20$^{th}$). Then, the control unit 31 subtracts the fluctuation range of power consumption amounts obtained in Step S14 from the planned reduction amount, to thereby determine the "declared reduction amount" for declaration to the power company 1.

Note that the control unit 31 of the aggregator 3 transmits the "declared reduction amount" via communication to the power company 1. With this configuration, when the power company 1 issues the power consumption amount adjustment request, the power company 1 selects the aggregator 3 or an aggregator to which the request will be sent from among other aggregators based on an amount of the declared "declared reduction amount."

In Step S16, the control unit 31 of the aggregator 3 stipulates an allocation plan for a reduction load for when there is a power consumption amount adjustment request from the power company 1 in the future. Specifically, the control unit 31 reads out each consumer DR plan information 34*a* and each consumer DR performance information 34*f* from the storage unit 34, specifies consumers to accede the power consumption amount adjustment request on the future date and time (for example, 1 p.m. to 2 p.m. on March 20$^{th}$), and tentatively determines the allocation plan for the reduction load among the specified consumers in order of how good their performance is (even allocates in an order that can satisfy the power consumption amount adjustment request). By allocating in order of performance in this way, when the power company 1 has issued the power consumption amount adjustment request, the control unit 31 can secure reliability as the aggregator 3 by having the consumers carry out reduction and the like as close to the plan as possible.

Note that the above-mentioned tentative determination refers to tentatively determining a plan in which, for example, in a case in which the power consumption amount planned to be reduced for the time period from 1 p.m. to 2 p.m. on March 20$^{th}$ is reported by each consumers as illustrated in FIG. 6, when the order of performance grasped from the consumer DR performance information 34*f* is in the order of consumer A, consumer B, consumer C, consumer D, consumer E, and the power company 1 has issued a power consumption amount adjustment request for 500 kW in the time period from 1 p.m. to 2 p.m. on March 20$^{th}$, the power consumption amount adjustment request is acceded by imposing on consumer A, who has the best performance record, a reduction of 300 kW as the power consumption amount planned to be reduced, and imposing on consumer B, who has the next best performance record, a reduction of 200 kW as the power consumption amount planned to be reduced.

In Step S17, after the tentative determination has been carried out in Step S16, the control unit 31 of the aggregator 3 determines whether or not reducing the power consumption amount as planned would be difficult for one air conditioning apparatus 5 of the consumers A to E that are managed. Specifically, the control unit 31 determines whether or not there is an air conditioning apparatus 5 for which a cancellation probability, which is a probability of canceling the plan to accede the power consumption amount adjustment request in the time period in which the tentative determination in Step S16 was carried out, is higher than a predetermined value, or an air conditioning apparatus 5 for which the cancellation probability increases at a rate higher than a predetermined increase rate.

Here, the cancellation probability is defined such that the detected temperature of the indoor temperature sensor 29 of the air conditioning apparatus 5 of each of the consumers becomes higher as a degree of deviating from a comfortable temperature range defined in advance for each of the air conditioning apparatuses 5 of the consumers becomes larger. Specifically, the cancellation probability is not particularly limited, and, in this embodiment, the cancellation probability is set such that the cancellation probability increases by 20% each time the detected temperature of the indoor temperature sensor 29 deviates from the comfortable temperature range by one degree. That is, when the comfortable temperature range is from 20° C. to 25° C., during cooling, the cancellation probability is 20% when the detected temperature of the indoor temperature sensor 29 is 26° C., which exceeds the upper limit of the comfortable temperature range; 40% when the detected temperature is 27° C.; 60% when the detected temperature is 28° C.; and so on.

Further, in this embodiment, at the stage after the tentative determination in Step S16 has been carried out, and before the time period in which the tentatively determined content is to be carried out has begun, the control unit 31 determines whether or not any of the air conditioning apparatuses 5 of the consumers has a cancellation probability of over 50%, and whether or not any of the air conditioning apparatuses 5 has a cancellation probability increase rate that exceeds 30% hour.

Note that, at the stage after the tentative determination in Step S16 has been carried out, and before the time period in which the tentatively determined content is to be carried out has begun, the control unit 31 of the aggregator 3 constantly acquires, via communication, the detected temperature of the indoor temperature sensor 29 of the air conditioning apparatus 5 of each of the consumers, to thereby grasp the cancellation probability and the increase rate of the cancellation probability.

Here, when there exists an air conditioning apparatus 5 for which the cancellation probability is higher than a predetermined value, or the increase rate of the cancellation probability is higher than a predetermined value, the processing shifts to Step S18. When no such air conditioning apparatus 5 exists, the processing shifts to Step S19.

In Step S18, the control unit 31 of the aggregator 3 redistributes the allocation plan for the reduction load because there exists an air conditioning apparatus 5 for which the cancellation probability is higher than a predetermined value, or the increase rate of the cancellation probability is higher than a predetermined value.

Specifically, for an air conditioning apparatus 5 of a consumer which has been determined as having a high cancellation probability or the like, even when the performance of that air conditioning apparatus 5 grasped from each consumer DR performance information 34*f* is good, the control unit 31 performs processing of postponing a load priority order of the air conditioning apparatus 5 when the consumer accedes the power consumption amount adjustment request to a time later than that of air conditioning apparatuses 5 of other consumers.

For example, when the power consumption amount that has been planned to be reduced is reported as illustrated in FIG. 6 by each of the consumers for the time period from 1 p.m. to 2 p.m. on March 20$^{th}$, and when the order of performance grasped from the consumer DR performance information 34*f* is in the order of consumer A, consumer B, consumer C, consumer D, and consumer E, an allocation priority order of the air conditioning apparatuses 5 changes to the order of consumer A, consumer C, consumer D, consumer E, and consumer B when it is determined that the cancellation probability for consumer B for the time period from 1 p.m. to 2 p.m. on March 20$^{th}$ is higher than a predetermined value. Further, when the power company 1 issues the power consumption amount adjustment request for 500 kW for the time period from 1 p.m. to 2 p.m. on March 20$^{th}$, the control unit 31 redistributes the reallocation of the reduction load such that the plan is as follows. That is, the request is acceded by imposing on the consumer A, who has the best performance, a load of 300 kW as the power consumption amount planned to be reduced; imposing on consumer C, who has the further next best performance, in place of consumer B who has the next best performance, a load of 100 kW as the power consumption amount planned to be reduced; and imposing the remaining 100 kW adjustment request on consumer D, who has the next best performance, as one part of a 200 kW power consumption amount planned to be reduced.

Note that, when there is a plurality of air conditioning apparatuses 5 for which the cancellation probability is high, or the increase rate of the cancellation probability is high, this embodiment employs a configuration such that the above-mentioned allocation priority order of the air conditioning apparatus 5 is postponed for longer as the cancellation probability increases, or as the increase rate of the cancellation probability increases. Further, when comparing the cancellation probability and the increase rate of the cancellation probability, the method of comparison is not particularly limited, and, in this embodiment, the allocation priority order is determined by comparing the cancellation probability and two times the value of the increase rate of the cancellation probability per hour.

In Step S19, it is determined whether or not it has become the time at which the time period in which the tentatively determined content is to be carried out, or the time period in which redistributed contents are to be carried out is to begin (in the above example, it is determined whether or not it has become 1 p.m. on March 20$^{th}$). Here, when it has not yet become the time, the processing returns to Step S17 and is repeated. When it has become the time, the processing proceeds to Step S20.

In Step S20, the control unit 31 of the aggregator 3 determines whether or not a power consumption amount adjustment request issued from the power company 1 has been received. Here, the processing shifts to Step S22 when a request has been received, and the processing shifts to Step S21 when a request has not been received.

In Step S21, the control unit 31 of the aggregator 3 determines whether or not the time period in which the tentatively determined content is to be carried out, or the time period in which redistributed contents are to be carried out, has finished. Here, when the time period has not finished, the processing returns to Step S20. Further, when the time period has finished, it is assumed that no power consumption amount adjustment request was received during the time period in which the tentatively determined content is to be carried out, or the time period in which the redistributed contents are to be carried out, and hence the processing ends.

In Step S22, the control unit 31 of the aggregator 3 sends an instruction to carry out the reduction of power consumption to the controller 4 of each of the consumer based on either, when there is no air conditioning apparatus 5 for which the cancellation probability or the like is high in Step S17, the allocation plan for the reduction load that was tentatively determined in Step S16, or, when the allocation plan for the reduction load was redistributed in Step S18, the redistributed allocation plan for the reduction load.

Note that the control unit 41 of the controller 4 of each of the consumer that has received the instruction for reduction of power consumption through the above processing carries out the reduction of the power consumption amount by controlling the air conditioning apparatus 5 in accordance with the DR control information 44*g* stored in the storage unit 44 of the controller 4.

In Step S23, the control unit 31 of the aggregator 3 communicates with the controller 4 of each of the consumer, by which the instruction for the power consumption amount adjustment request was transmitted, to thereby receive information on whether or not the planned reduction of the power consumption amount has been carried out as planned.

In Step S24, the control unit 31 of the aggregator 3 performs update processing of granting an incentive to the consumer that has carried out the reduction as planned, and increasing the performance of that consumer in each consumer DR performance information 34*f*. The control unit 31 also performs update processing of imposing a penalty on the consumer that could not carry out the reduction as planned, and reducing the performance of that consumer in each consumer DR performance information 34*f*. Note that each consumer directly receives the incentive or the like from the aggregator 3 when the aggregator 3 has received the incentive or the like from the power company 1, and that each consumer directly receives the incentive or the like from the power company 1 when the aggregator 3 has not received the incentive or the like from the power company 1. The processing then ends.

(7) Characteristics of Aggregator 3

When there exists an air conditioning apparatus 5 of the consumer for which the cancellation probability of the power consumption amount adjustment request or the like is high at the time point after the allocation plan for the reduction load has been tentatively determined, the aggregator 3 according to this embodiment does not determine the distribution of the reduction load based only on the power consumption amount planned to be reduced that is reported from each consumer and the performance priority of each of the consumers. Instead, the aggregator 3 lowers the distribution priority order for the consumer having the high cancellation probability, and distributes the request to another consumer, to thereby redistribute the allocation plan for the reduction load. Here, the allocation plan for the reduction load is redistributed at a stage before the planned time period in which the power consumption amount adjustment request is to be carried out has begun.

With the above configuration, even when there exists an air conditioning apparatus 5 of the consumer for which the cancellation probability of the power consumption amount adjustment request or the like is high at the time point after the allocation plan for the reduction load has been tentatively determined, it is possible to eliminate or reduce the degree of allocation to the consumer with the high cancellation probability, to thereby suppress the occurrence of failure to carry out reduction due to a cancellation before (at the last minute of) the power consumption amount adjustment request is carried out, or while the power consumption amount adjustment request is being carried out, and increase reliability as the aggregator 3.

Note that, apart from excluding the consumer having the high cancellation probability or the like, the reduction load is allocated in descending order to consumers with good past power consumption amount adjustment request performance, and hence it is possible to preferentially impose the reduction on the consumer having a high probability of carrying out the reduction as planned, to thereby more easily suppress the occurrence of failure to carry out reduction.

(8) Modifications (8-1) Modification A

In the embodiment described above, a case in which the aggregator 3 stores various types of information in the storage unit 34 is taken as an example.

Figure 14:
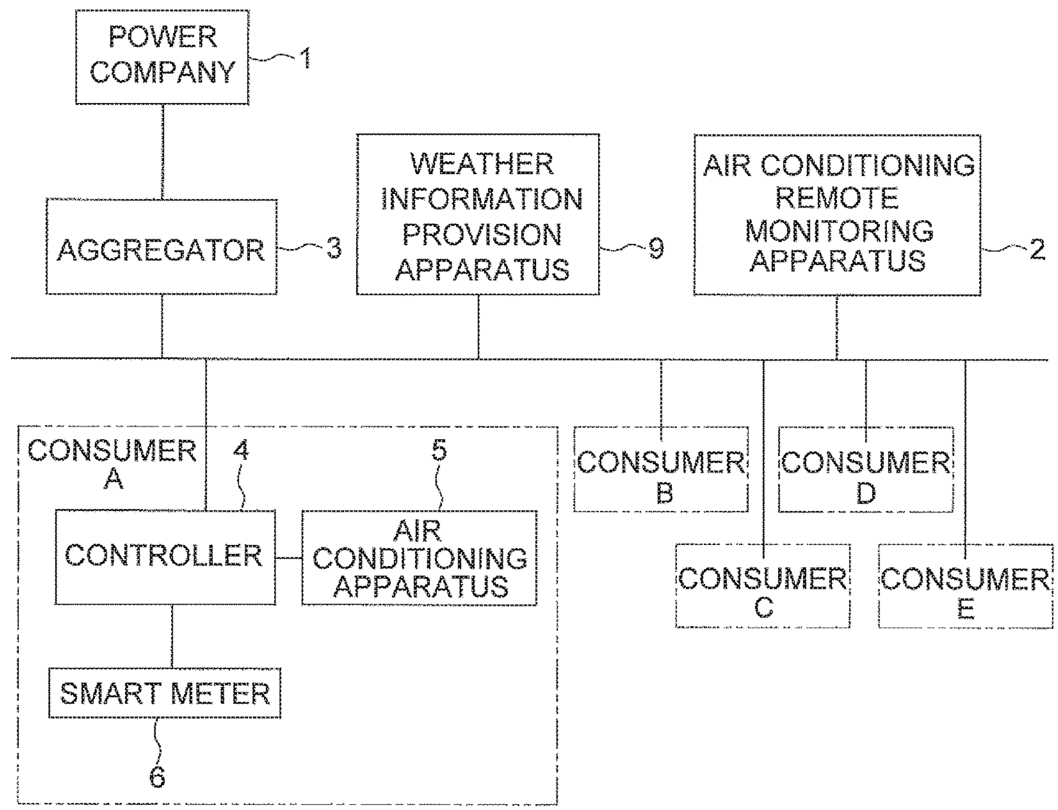
FIG. 14 is a schematic configuration diagram of an entire information processing system including an aggregator according to a Modification (A) of the present invention.

However, for example, as illustrated in the schematic configuration diagram of the entire information processing system of FIG. 14, the information processing system includes an air conditioning remote monitoring apparatus 2 that is connected in a communicable manner via a communication circuit to an aggregator 203 that does not include the various types of information, and the various types of information may be stored in a storage unit included in the air conditioning remote monitoring apparatus 2. Further, the aggregator 203 may acquire various types of information from the air conditioning remote monitoring apparatus 2 via communication to calculate redistribution of the allocation plan for the reduction load, the fluctuation range of the power consumption amounts, and the declared reduction amount.

(8-2) Modification B

In the embodiment described above, the aggregator 3, which directly receives the power consumption amount adjustment request from the power company 1, is taken as an example.

Figure 15:
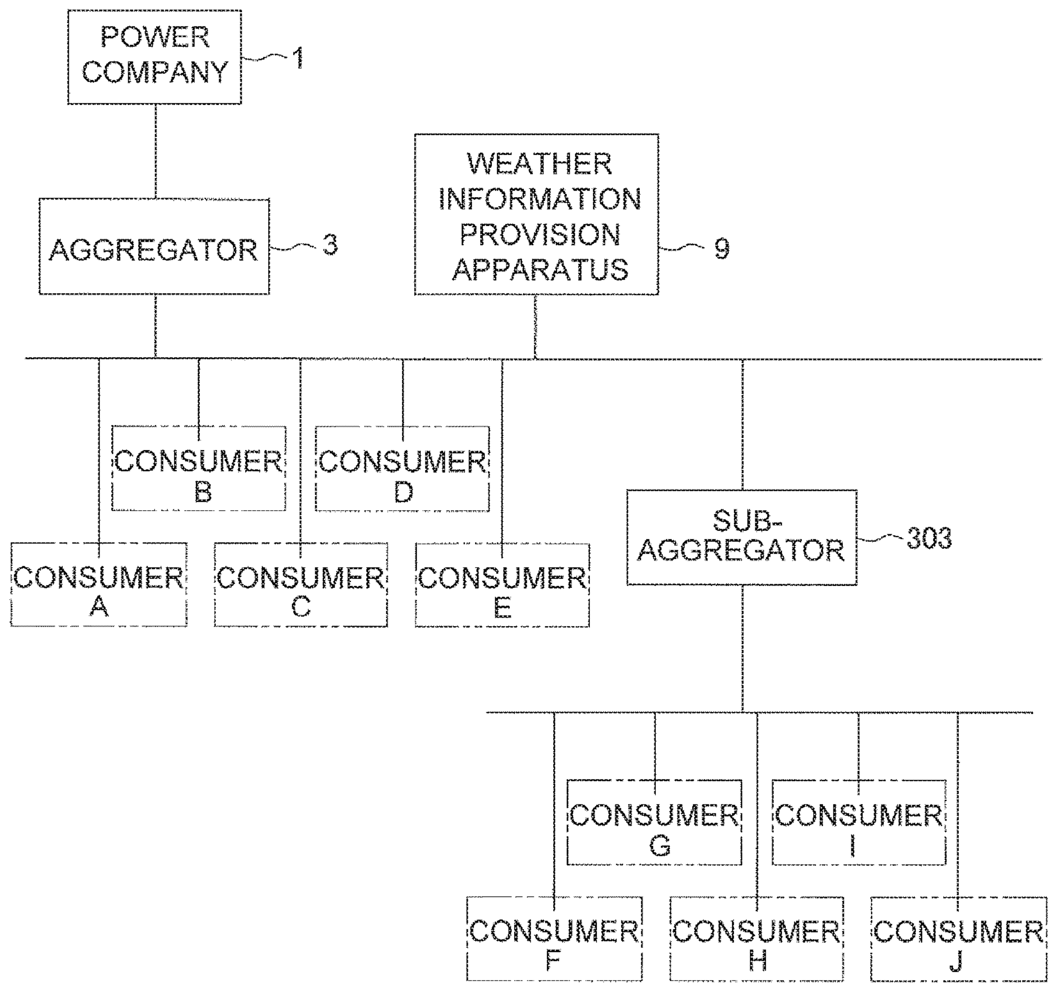
FIG. 15 is a schematic configuration diagram of an entire information processing system including an aggregator according to a Modification (B) of the present invention.

However, the management apparatus of the air conditioning apparatus is not limited to the aggregator 3 of the above-mentioned embodiment, and, for example, as illustrated in the schematic configuration of the entire information processing system of FIG. 15, the management apparatus may be a sub-aggregator 303 as one component to be managed by the aggregator 3. In this case, the sub-aggregator 303 includes consumers F to J (each having an air conditioning apparatus 5) as individual management targets of the sub-aggregator 303, and is configured to receive an adjustment request from the aggregator 3, which has directly received the power consumption amount adjustment request from the power company 1, to perform processing of allocating that adjustment request to the consumers F to J that are managed, and the like. The sub-aggregator 303 collects, compiles, and sends to the aggregator 3 DR plan information, schedule information, output level history information, operation history information, and other types of information on the consumers F to J that are managed by the sub-aggregator 303, all together. With this configuration, the aggregator 3 treats the consumers F to J that are managed by the sub-aggregator 303 as if they are one consumer according to the above-mentioned embodiment. Other configurations of the sub-aggregator 303 are the same as those of the above-mentioned aggregator 3, and hence are omitted from the description herein.

(8-3) Modification C

In the above-mentioned embodiment, during cooling, a case in which the cancellation probability is set to increase as the detected temperature of the indoor temperature sensor 29 exceeds the upper limit of the comfortable temperature range is taken as an example.

In contrast, for example, during heating, the cancellation probability may be set to increase as the detected temperature of the indoor temperature sensor 29 falls below the lower limit of the comfortable temperature range.

Further, during the heating operation, when the air conditioning apparatus 5 is predicted to start the defrost operation, the cancellation probability may be corrected such that the cancellation probability increases.

Specifically, the cancellation probability may be set to increase by 20% each time the detected temperature deviates from the comfortable temperature range by one degree such that, for example, when the comfortable temperature range is from 20° C. to 25° C., during heating, the cancellation probability is 20% when the detected temperature of the indoor temperature sensor 29 is 19° C., which falls below the lower limit of the comfortable temperature range; 40% when the detected temperature is 18° C.; 60% when the detected temperature is 17° C.; and so on. When the air conditioning apparatus 5 is predicted to start the defrost operation, the cancellation probability specified in this way may be corrected to increase by a further predetermined percentage (for example, 10%).

When the defrost operation is carried out as described above, the room cannot be heated during the defrost operation, and hence it is predicted that the indoor temperature is to further decrease, and that there is a possibility that the power consumption amount adjustment request is to not be acceded as planned due to the consumer feeling uncomfortable and increasing the output of the heating operation, or the like. Therefore, in such a case, for the air conditioning apparatus 5 of the consumer that is predicted to carry out the defrost operation, the cancellation probability is corrected to be much higher, to thereby make it possible to more easily suppress the occurrence of failure to accede the reduction request.

Note that, as the defrost operation, there is given an example in which the connection state of the four-path switching valve 22 of the refrigerant circuit 20 is switched to a cooling cycle during the heating operation, to thereby operate to supply discharge gas from the compressor 21 to the outdoor heat exchanger 23.

Here, as a case in which the start condition for the defrost operation is satisfied for the air conditioning apparatus 5 of each of the consumer, there can be given a case in which either a condition that a predetermined amount of time has passed since the start of the heating operation or the end of the last defrost operation, and the temperature of the outdoor heat exchanger (the detected temperature of the outdoor heat exchange temperature sensor 28*b*) has fallen below a predetermined temperature, or a condition that a predetermined amount of time has passed since the start of the heating operation or the end of the last defrost operation, and the outside temperature (the detected temperature of the outdoor temperature sensor 28*a*) has fallen below a predetermined temperature is satisfied. Further, in this case, the control unit 31 of the aggregator 3 communicates with each of the controllers 4 of each of the consumers at a stage before the time period after the tentative determination has been carried out, and the tentatively determined content is to be carried out, to obtain the detected temperature of the outdoor heat exchange temperature sensor 28*b*, the detected temperature of the outdoor temperature sensor 28*a*, and history information on the defrost operation and the heating operation, to thereby grasp the probability of starting the defrost operation. Specifically, for example, when the predetermined amount of time has passed since the start of the heating operation and the end of the last defrost operation in the time period in which the adjustment request is to be acceded and directly prior to that time period (for example, within 30 minutes before), and it is determined, from a temperature decrease rate of the detected temperature of the outdoor heat exchange temperature sensor 28*b* and a temperature decrease rate of the detected temperature of the outdoor temperature sensor 28*a*, that the condition is to be satisfied in the time period in which the adjustment request is to be acceded and directly prior to that time period, the cancellation probability for the applicable air conditioning apparatus 5 of the consumer may be corrected so as to increase.

(8-4) Modification D

In the above-mentioned example, a case in which the tentative determination is carried out by allocating the reduction load to consumers in order of consumers who have better past power consumption amount adjustment request performance, and the redistribution is carried out by allocating the reduction load to consumers in order of consumers who have better performance, excluding the consumers having a high cancellation probability or the like, is taken as an example.

In contrast, for example, the allocation of the reduction load is not limited to the above example, and, for example, the reduction load for the power consumption amount adjustment request may be allocated based on the magnitude of power consumption amount planned to be reduced by each of the consumers, to thereby redistribute the reduction load by reducing an allocation rate for the consumer having the high cancellation probability or the like.

Specifically, for example, in allocating the reduction load for the power consumption amount adjustment request in the time period from 1 p.m. to 2 p.m. on March 20$^{th}$ according to the above-mentioned embodiment illustrated in FIG. 6, the reduction load is allocated such that [consumer A (power consumption amount planned to be reduced is 300 kW): consumer B (power consumption amount planned to be reduced is 200 kW):consumer C (power consumption amount planned to be reduced is 100 kW):consumer D (power consumption amount planned to be reduced is 200 kW):consumer E (power consumption amount planned to be reduced is 200 kW)]=3:2:1:2:2. Specifically, when there is a reduction request of 500 kW as the power consumption amount adjustment request, the consumer A bears 150 kW, the consumer B bears 100 kW, the consumer C bears 50 kW, the consumer D bears 100 kW, and the consumer E bears 100 kW.

Further, when it is determined that the cancellation probability or the like of the air conditioning apparatus 5 of the consumer B is high, the ratio of distribution to the consumer B is reduced to, for example, ⅕, and the remaining load is imposed on the other consumers A, C, D, and E based on the magnitude of the power consumption amount planned to be reduced. Specifically, when there is a reduction request of 500 kW as the power consumption amount adjustment request, the consumer A bears 180 kW, the consumer B bears 20 kW, the consumer C bears 60 kW, the consumer D bears 120 kW, and the consumer E bears 120 kW.

In the cases described above, it is possible to allocate a large reduction load to a consumer with the resources to accede that load by suppressing the occurrence of a failure to carry out the reduction due to a cancellation, and distributing the load based on the magnitude of power consumption amount planned to be reduced that is reported by each of the consumers. As a result, it becomes less likely for a specific consumer to attempt an unachievable reduction.

What is claimed is:

1. A management apparatus for a plurality of air conditioning apparatuses, the management apparatus being configured to manage, based on a power consumption amount adjustment request, the air conditioning apparatuses which condition air in each of a plurality of target spaces, the management apparatus comprising:

a distribution information generation unit configured to, when the power consumption amount adjustment is requested, generate distribution information used to distribute the power consumption amount adjustment request to the air conditioning apparatuses; and an information acquisition unit configured to acquire current state information for each of the air conditioning apparatus, the distribution information generation unit calculating a probability of each of the air conditioning apparatus canceling the power consumption amount adjustment request at a future time relative to a time point of the current state information, based on the current state information acquired by the information acquisition unit, and the distribution information being updated by either reducing a distribution amount to one of the air conditioning apparatuses for which the probability is higher than a predetermined value and allocating the distribution amount to another one of the air conditioning apparatuses, or reducing the distribution amount to one of the air conditioning apparatuses for which an increase rate of the probability is higher than a predetermined value and allocating the distribution amount to another one of the air conditioning apparatuses.

2. The management apparatus for the air conditioning apparatuses according to claim 1, wherein the current state information includes current state environment information for each of the target spaces, the environment information includes at least temperature information for each of the target spaces, and the distribution information generation unit calculates the probability based on the temperature information acquired by the information acquisition unit such that the probability increases as an uncomfortable degree in the target space increases.

3. The management apparatus for the air conditioning apparatuses according to claim 2, wherein the air conditioning apparatuses include an air conditioning apparatus with a defrost function capable of carrying out a defrost operation during a heating operation, the information acquisition unit acquires determination information used in a determination of a start of the defrost operation from the air conditioning apparatus with the defrost function, and the distribution information generation unit predicts the start of the defrost operation by the air conditioning apparatus with the defrost function based on the determination information acquired by the information acquisition unit, and calculates the probability such that the probability increases for the air conditioning apparatus with the defrost function predicted to start the defrost operation.

4. The management apparatus for the air conditioning apparatuses according to claim 1, wherein the information acquisition unit further acquires history information of cancellation of the power consumption amount adjustment request for each of the air conditioning apparatuses, the distribution information generation unit updates the distribution information based on both the current state information and the history information acquired by the information acquisition unit, and the distribution information generation unit updates the distribution information such that the distribution amount is preferentially allocated to one of the air conditioning apparatuses determined to have a low frequency of canceling the power consumption amount adjustment request based on the history information.

5. The management apparatus for the air conditioning apparatuses according to claim 2, wherein the information acquisition unit further acquires history information of cancellation of the power consumption amount adjustment request for each of the air conditioning apparatuses, the distribution information generation unit updates the distribution information based on both the current state information and the history information acquired by the information acquisition unit, and the distribution information generation unit updates the distribution information such that the distribution amount is preferentially allocated to one of the air conditioning apparatuses determined to have a low frequency of canceling the power consumption amount adjustment request based on the history information.

6. The management apparatus for the air conditioning apparatuses according to claim 3, wherein the information acquisition unit further acquires history information of cancellation of the power consumption amount adjustment request for each of the air conditioning apparatuses, the distribution information generation unit updates the distribution information based on both the current state information and the history information acquired by the information acquisition unit, and the distribution information generation unit updates the distribution information such that the distribution amount is preferentially allocated to one of the air conditioning apparatuses determined to have a low frequency of canceling the power consumption amount adjustment request based on the history information.

* * * * *